United States Patent [19]
Sato

[11] Patent Number: 6,029,107
[45] Date of Patent: Feb. 22, 2000

[54] CONTROL APPARATUS FOR AN AUTOMATIC TRANSMISSION OF A VEHICLE AND CONTROL METHOD THEREOF

[75] Inventor: Kazuhiko Sato, Hitachioota, Japan

[73] Assignee: Hitachi, Ltd., Japan

[21] Appl. No.: 08/807,991

[22] Filed: Mar. 3, 1997

[30] Foreign Application Priority Data

Mar. 1, 1996 [JP] Japan .................................. 8-045116
Apr. 22, 1996 [JP] Japan .................................. 8-100448

[51] Int. Cl.[7] ................................................ F16H 59/66
[52] U.S. Cl. .............................. 701/58; 701/65; 477/120; 477/901
[58] Field of Search .................................. 701/65, 51, 58, 701/60, 61; 477/46, 97, 120, 901

[56] References Cited

U.S. PATENT DOCUMENTS

| 4,648,291 | 3/1987 | Klatt et al. ............................ 477/119 |
| 5,319,555 | 6/1994 | Iwaki et al. ............................ 701/57 |
| 5,389,050 | 2/1995 | Sakai et al. ............................ 701/57 |
| 5,514,050 | 5/1996 | Bäuerle et al. ........................ 477/118 |
| 5,611,748 | 3/1997 | Kashiwabara .......................... 477/47 |
| 5,655,991 | 8/1997 | Lardy et al. ............................ 477/48 |
| 5,669,847 | 9/1997 | Kashiwabara .......................... 477/46 |

FOREIGN PATENT DOCUMENTS

| 63-579953 | 3/1988 | Japan . |
| 63-121537 | 5/1988 | Japan . |
| 6-323416 | 11/1994 | Japan . |

OTHER PUBLICATIONS

Automatic Transmission Control System with Torque Estimation Technology, M. Ibamoto et al., Hitachi Review, vol. 44 (1995) No. 3, pp. 139–144.

Development of Smooth Shift Control System with Output Torque Estimation, M. Ibamoto et al., pp. 163–168, 1995.

*Primary Examiner*—William A. Cuchlinski, Jr.
*Assistant Examiner*—Edward Pipala
*Attorney, Agent, or Firm*—Evenson, McKeown, Edwards & Lenahanj P.L.L.C.

[57] ABSTRACT

A gear ratio of the automatic transmission is controlled by changing a speed ratio between an input-side rotating member to which the driving force from an engine is transmitted and an output-side rotating member through which the driving force is transmitted to driven wheels. The control apparatus has a vehicle speed detecting part for detecting the speed of the vehicle; a a road gradient estimating part for estimating the gradient of road; a gradient determining part for determining whether or not the road gradient estimated by a road gradient estimating part is beyond a predetermined threshold value; a vehicle speed determining part for determining a target vehicle speed based on the vehicle speed detected by the vehicle speed detecting part, when it is determined by the gradient determining part that the road gradient is beyond the predetermined threshold value; and a control part for controlling the gear ratio so that the vehicle speed can match up to the target vehicle speed determined by the vehicle speed determining part, when it is determined by the gradient determining part that the road gradient is beyond the predetermined threshold value.

15 Claims, 18 Drawing Sheets

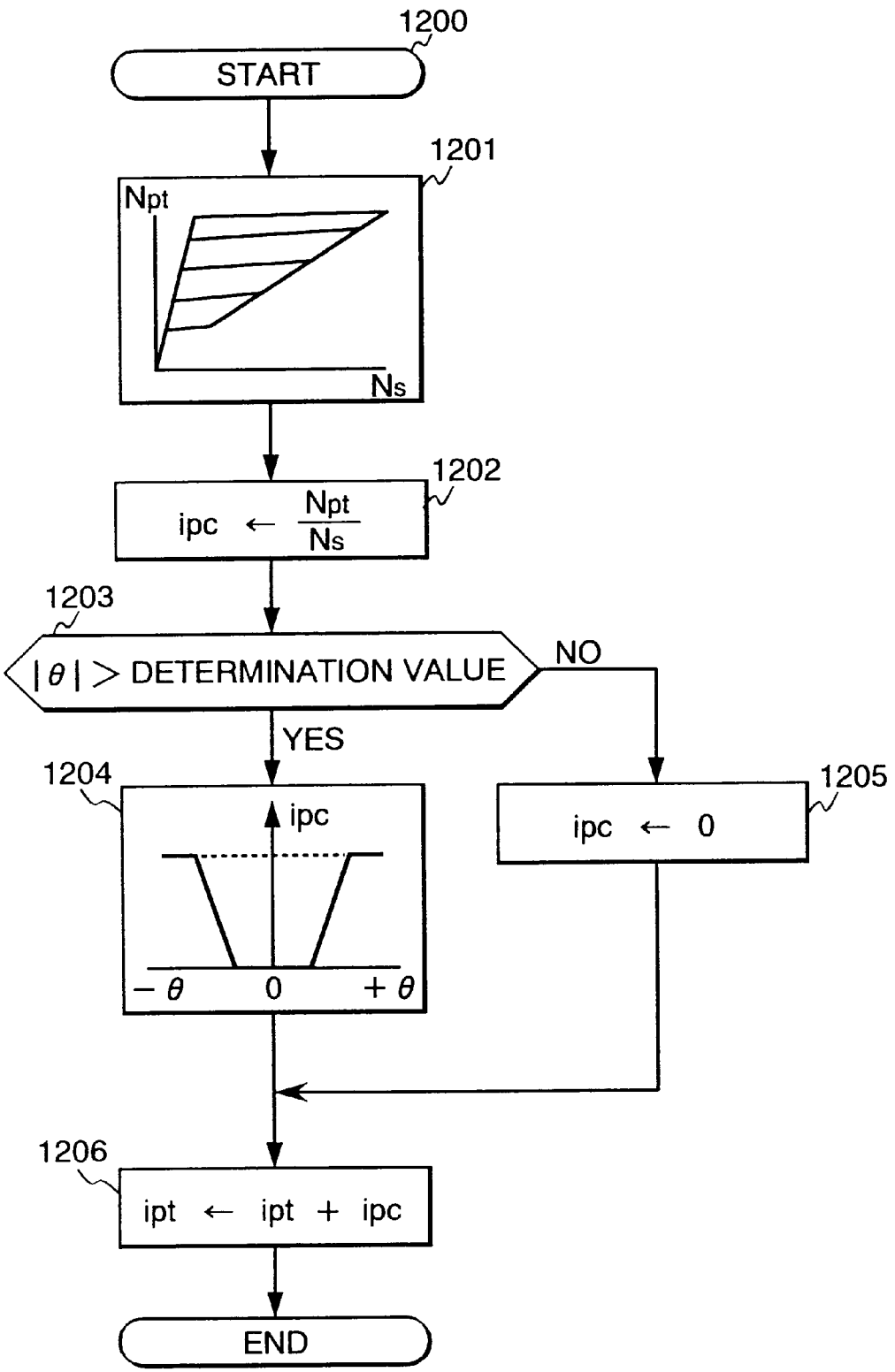

CONTROL APPARATUS FOR AN AUTOMATIC TRANSMISSION OF A VEHICLE AND CONTROL METHOD THEREOF

BACKGROUND OF THE INVENTION

A conventional non-step type automatic transmission (hereinafter, referred as a CVT) for a vehicle is disclosed in Japanese Patent Application Laid-Open No. 63-57953 (1988), in which the gear ratio of the CVT is controlled so as to match a target gear ratio obtained by using a vehicle speed and a throttle opening. However, it was difficult to smoothly traverse the uphill or downhill.

Further, a control apparatus for the CVT of the vehicle is disclosed in Japanese Patent Application Laid-Open No. 63-121537 (1988), in which the performance of an engine brake and that of acceleration are improved such that it can be easy for a vehicle to run a road with gradient. In the control apparatus for the non-step type automatic transmission for the vehicle disclosed in Japanese Patent Application Laid-Open No. 63-121537 (1988), a target gear ratio of the CVT calculated by using a vehicle speed detected by a driven shaft rotation sensor and an opening of a throttle valve detected by a throttle valve opening sensor is corrected appropriately by using a correction amount of a speed ratio determined by an angle of inclination of the vehicle detected sequentially by a vehicle inclination angle sensor. Accordingly, since a value suitable for the road gradient can be set as the target speed ratio for the CVT, an effective engine brake can be automatically applied on the downhill and effective acceleration can be automatically obtained on the uphill. In other words, if this control apparatus is installed in a vehicle, both the running safety and performance can be obtained.

However, it is required to mount the vehicle gradient angle sensor on the vehicle in order to detect the road gradient. Accordingly, the manufacturing cost for the vehicle increases due to the attachment of new parts.

SUMMARY OF THE INVENTION

An object of the present invention is to provide a control apparatus of an automatic transmission for a vehicle and a control method thereof, in which the gear ratio can be automatically controlled according to the condition of road surface so that effective engine brake suitable for a road gradient can be automatically applied on the downhill and effective driving force suitable for the road gradient can be automatically obtained on the uphill.

Another object of the present invention is to provide a control apparatus of an automatic transmission for a vehicle and a control method thereof, in which effective engine brake suitable for a road gradient can be automatically applied on the downhill and effective performance of acceleration can be automatically obtained on the uphill, without providing a further sensor to the vehicle.

In a control apparatus for an automatic transmission of a vehicle according to the present invention, a gear ratio of the automatic transmission is controlled by changing a speed ratio between an input-side rotating member to which the driving force from an engine is transmitted and an output-side rotating member through which the driving force is transmitted to driven wheels. The control apparatus comprises: a vehicle speed detecting part for detecting the speed of the vehicle; a road gradient estimating part for estimating the gradient of road on which the vehicle is running; a gradient determining part for determining whether or not the road gradient estimated by said a road gradient estimating part is beyond a predetermined threshold value; a vehicle speed determining part for determining a target vehicle speed on the basis of the vehicle speed detected by said vehicle speed detecting part, when it is determined by said gradient determining part that the road gradient is beyond the predetermined threshold value; and a control part for controlling the gear ratio so that the vehicle speed can substantially match up to the target vehicle speed determined by said vehicle speed determining part, when it is determined by said gradient determining part that the road gradient is beyond the predetermined threshold value. The road gradient estimating part further comprises: a vehicle driving torque calculating part for calculating the vehicle driving-torque to drive the driven wheels, output from the output-side rotating member; a running resistance calculating part for obtaining a running resistance torque on the basis of the vehicle speed detected by said vehicle speed detecting part; an acceleration torque calculating part for obtaining the acceleration of the vehicle, and calculating the acceleration torque on the basis of the obtained acceleration; and a gradient calculating part for obtaining a gradient torque and calculating the road gradient on the basis of the obtained gradient torque, in which the gradient torque is obtained by subtracting the running resistance torque calculated by said running resistance calculating part and the acceleration torque calculated by said acceleration torque calculating part from the vehicle driving torque calculated by said vehicle driving-torque calculating part.

Further, in a control method of an automatic transmission of a vehicle according to the present invention, a gear ratio of the automatic transmission is controlled by changing a speed ratio between an input-side rotating member to which the driving force from an engine is transmitted and an output-side rotating member through which the driving force is transmitted to driven wheels. The control method comprises the steps of: detecting the speed of the vehicle, and a vehicle driving torque for driving driven wheels, output from the output-side rotating member; obtaining a gradient torque by subtracting the acceleration torque and the running resistance torque obtained on the basis of the detected vehicle speed from the detected vehicle driving torque, and estimating a gradient of the road on which the vehicle is running on the basis of the gradient torque; determining whether or not the road gradient estimated is beyond a predetermined threshold value; determining a target vehicle speed on the basis of the vehicle speed when it is determined that the road gradient estimated is beyond the predetermined threshold value; and controlling the gear ratio so that the vehicle speed can substantially match up to the target vehicle speed determined when it is determined that the road gradient estimated is beyond the predetermined threshold value.

By using the above configuration, the gear ratio of the automatic transmission is controlled so that the vehicle speed may match up to the target vehicle speed determined on the basis of the vehicle speed when the gradient of the road on which the vehicle is running is beyond a predetermined value. As a result, effective engine brake suitable for a road gradient can be automatically applied on the downhill and effective driving force suitable for the road gradient can be automatically obtained on the uphill.

In the control apparatus for an automatic transmission of a vehicle according to present invention, the gear ratio of a non-step transmission installed in the vehicle is controlled according to a running state of the vehicle. In addition the control apparatus comprises: a storing means for storing corresponding information in which a target gear ratio of the non-step transmission is uniquely identified by a road gradient; a gradient estimating means for estimating the gradient of the road which the vehicle is running by using the running state of the vehicle; and a determining means for determining that the vehicle is running on a slope when the estimated road gradient is within the predetermined range. Further, the transmission control apparatus controls the gear ratio of the non-step transmission by using the target gear ratio of the non-step transmission corresponding to the estimated road gradient due to the corresponding information stored in said storing means, when it is determined by said determining means that the vehicle is running on a slope.

Further, in a control method for an automatic transmission of a vehicle according to the present invention, the gear ratio of a non-step transmission installed in the vehicle is controlled according to a running state of the vehicle. The control method comprises the steps of: detecting the acceleration torque of the vehicle, the running resistance torque thereof and a torque of an output shaft of the non-step transmission; estimating the gradient of the road which the vehicle is running by using the running state of the vehicle detected at said detecting step; determining that the vehicle is running on a slope when the estimated road gradient is within the predetermined range; and controlling the gear ratio of the non-step transmission so that the gear ratio of the non-step transmission can match up to the target gear ratio corresponding to the estimated road gradient due to the corresponding information by which the target gear ratio is uniquely identified by the road gradient, when it is determined at said determining step that the vehicle is running on a slope.

Because, according to the present invention, effective engine brake is automatically applied even if it fails to change timely the shift range when the vehicle runs on a steep downhill, any unskilled drivers can drive easily traverse the steep downhill without frequently using the foot brake. In addition, it is possible to prevent wear of the brake pad occurring from brake application by the unskilled driver.

Further, because the road gradient can be estimated by using the output of the existing sensor, without installing a further specified sensor, an increase of the manufacturing cost does not occur. The manufacturing cost can be further decreased by estimating the weight of the vehicle due to the calculation as mentioned above.

BRIEF DESCRIPTION OF THE DRAWINGS

In the drawings, forming a part hereof, in which like reference characters denote like parts in the various views.

FIG. 17 is a flow chart illustrating the process of the ECU for the CVT of FIG. 10.

DESCRIPTION OF THE PREFERRED EMBODIMENTS

Before explaining the embodiments, the above prior art will be explained in more detail.

Figure 9A:
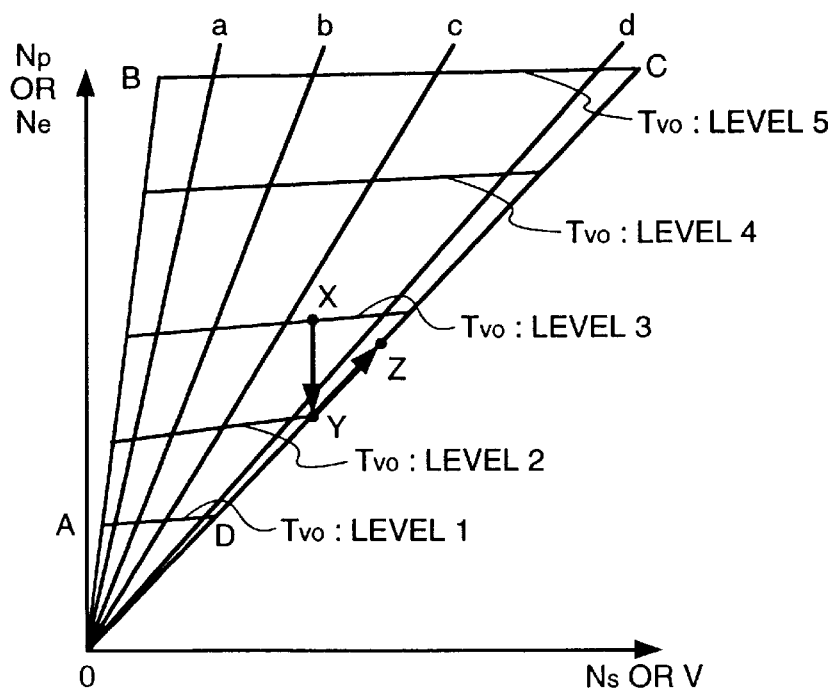
FIGS. 9A and 9B are graphs showing the gear schedule of the conventional automatic transmission.
Figure 9B:
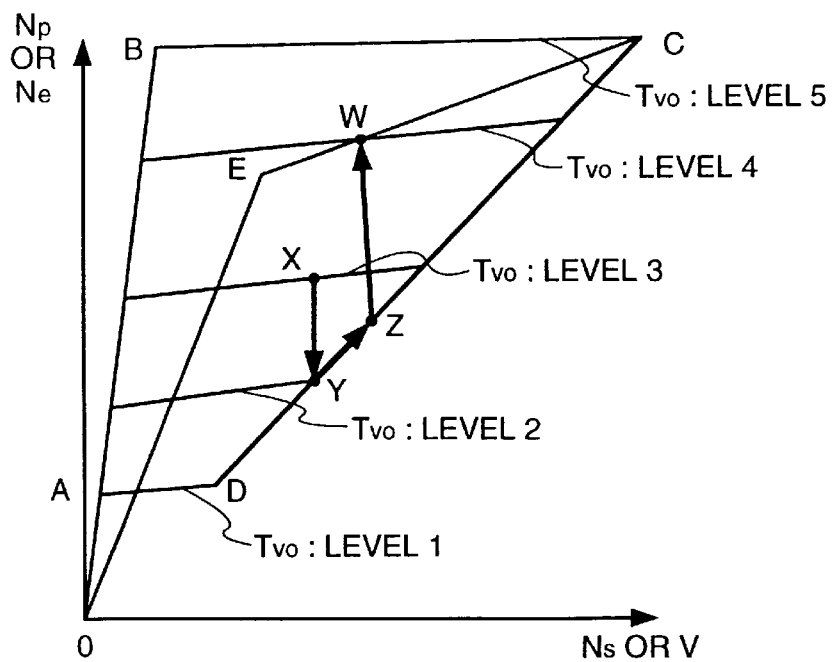

FIG. 9A is a graph showing the gear schedule of the conventional automatic transmission in a normal mode, and FIG. 9B graph showing the gear schedule of the conventional automatic transmission in a sport mode in which an engine speed is higher than that in the normal mode. In FIG. 9, the ordinate designates a primary speed Np (or an engine speed Ne), and the abscissa designates a secondary speed Ns (or a vehicle speed V). The primary speed Np is the speed of a pulley in an input side of the CVT to which a drive force from the engine is input, and the secondary speed Ns is the speed of a pulley in an output side of the CVT from which the drive force is transmitted to driven wheels. Further, a straight line Tvo designates the throttle opening. In FIGS. 9A and 9B, for convenience, the throttle opening is divided into 5 stages in which Level 1 designates a fully closed state, and Level 5 designates a fully open state.

In the conventional control method of the CVT, the CVT is controlled so as to match the primary speed Np corresponding to the current throttle opening Tvo and the secondary speed Ns, which was obtained according to the gear schedule shown in FIGS. 9A and 9B.

In case that the CVT is in the normal mode, the gear ratio Np/Ns is represented by the region surrounded with A-B-

C-D-A as shown in FIG. 9A. Namely, the gear ratio Np/Ns can be changed without step, if within the region A-B-C-D-A. Further, in case that the CVT is in the sport mode, the gear ratio Np/Ns is represented by the region surrounded with A-B-C-E-F-A as shown in FIG. 9B. Namely, the gear ratio Np/Ns can be changed without step, if within the region A-B-C-E-F-A. In this point, it is different from a stepped automatic transmission in which the gear ratio is represented by a plurality of straight lines passing through the original point O (O-a, O-b, O-c, O-d), and it can not be changed in non-step.

Further, the straight line O-A-B in the gear schedule of the CVT shown in FIGS. 9A and 9B designates the largest gear ratio.

Because in the prior art control method of the CVT a road gradient is not taken into consideration when the target gear ratio Np/Ns is determined, the following problems arise.

(1) Normally, a driver returns a gas pedal to reduce speed when the vehicle passes through a downhill. Assume that an X point is an operation point representing a state of the gear ratio just before the vehicle passes through the downhill. Because the throttle opening shifts to a "close" direction by returning the gas pedal, the operation point shifts to a Y point. Namely, the gear ratio Np/Ns shifts to a top side, and thus an engine brake becomes ineffective. As a result, the vehicle speed becomes higher regardless of the intention of a driver, and the operation point shifts to a Z point. In this case, if the driver tries to apply frequently a foot brake to slow down, then brake pads may wear and the foot brake may become ineffective.

It is possible to apply sufficiently the engine brake by changing the gear schedule to the sport mode when the operation point shifted to the Z point. In other words, if the driver changes intentionally the shift range from the normal mode to the sport mode when the operation point shifted to the Z point due to the speed-up as shown in FIG. 9B, then the operation point shifts from the Z point to a W point. It is, therefore, possible to apply sufficiently the engine brake. However, most unskilled drivers can not make this change intentionally.

(2) On a long uphill, it is necessary to increase the engine speed Ne by further depressing the gas pedal to maintain a certain speed and thus shifting the throttle opening Tvo in a "open" direction. It is necessary to depress deeply the gas pedal on steep uphill. In this case, while the gear ratio Np/Ns is gradually shifted to a "low" side at the same time as the depression of the gas pedal as shown in FIG. 9, it is also necessary to change the shift range from the normal mode to the sport mode on a steep uphill. Namely, because it is necessary to change the shift range according to the road gradient even in the CVT, a driver may feel the inconvenience.

Further, in the conventional CVT system, an ECU controls the CVT so that the shock of gear and the loss of transmission can be suppressed. However, it is difficult for an unskilled driver to maintain safety on a slope. When a vehicle pass through a steep downhill, a driver adjusts the depression force for the gas pedal not to accelerate. Because the throttle valve is closed according to the adjustment of the gas pedal, the running state is shifted from the X point to the Y point, and then to the Z point. As a result, the vehicle is accelerated regardless of the intention of the driver. Since the skilled driver can change to the sport mode at this time, it is possible to use effectively the engine brake and to suppress the acceleration of the vehicle. In other words, if the gear range is changed to the sport mode, then the running state of the vehicle is shifted from the operation point Z to a point W at which a larger gear ratio can be obtained, since it can be shifted within the region surrounded by O-A-B-C-E-F-A-O. As a result, the vehicle can descend downhill with the engine brake effectively applied.

However, most unskilled drivers who can not change timely the shift range are apt frequently to apply the foot brake on the downhill. As a result, wear of the brake pads is promoted.

While, if the gas pedal is depressed deeply during running on an uphill, the phenomenon is the inverse of the downhill run. In other words, the running state of a vehicle is shifted to the operation point on the "low" side from the operation point at which the vehicle just enters the uphill, in the gear schedule. However, unless the gas pedal is depressed more deeply, or the shift range is changed, it is impossible unintentionally to accelerate the vehicle.

A first embodiment of the present invention will be explained hereinafter with reference to the drawings.

Figure 1:
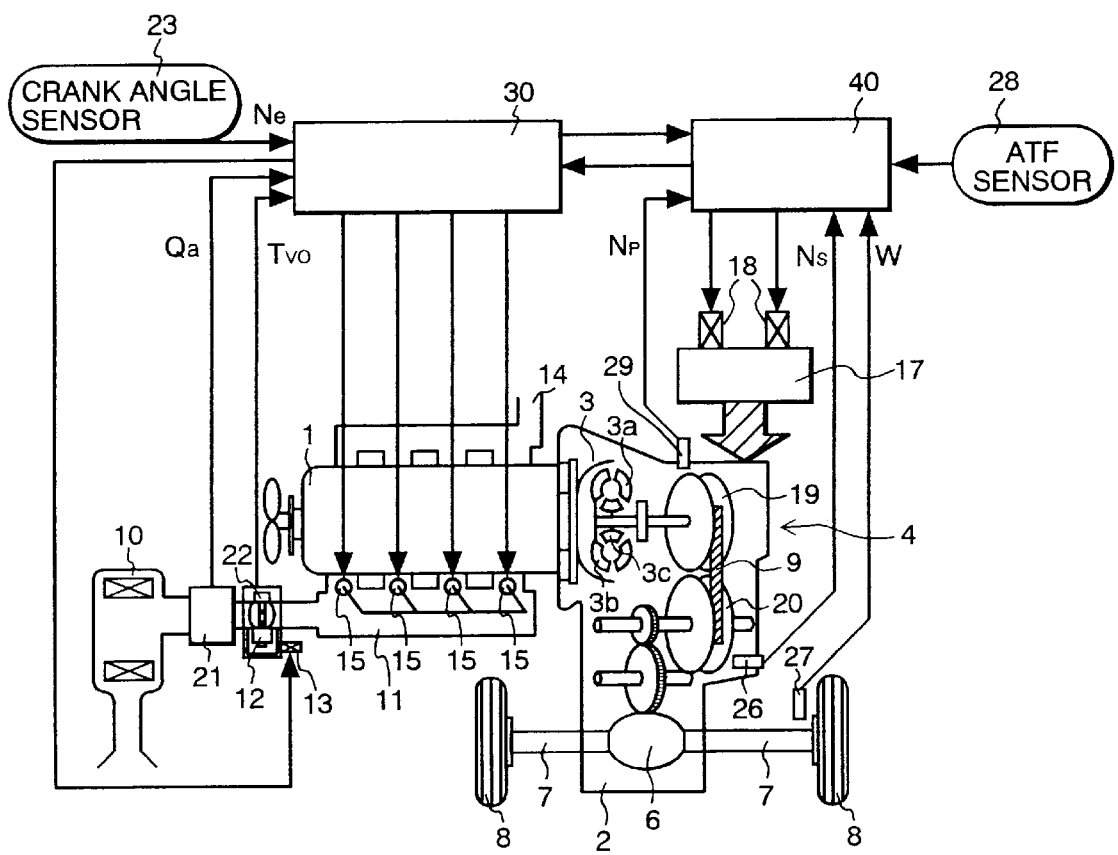
FIG. 1 is a block diagram showing a drive system for a vehicle in which a control apparatus for an automatic transmission of the vehicle according to a first embodiment of the present invention is applied.

FIG. 1 is a block diagram showing a drive system for a vehicle in which a control apparatus for an automatic transmission of the vehicle according to a first embodiment of the present invention is applied.

As shown in FIG. 1, the drive system for the vehicle according to the first embodiment of the present invention is provided with an engine 1, a CVT 2 connected mechanically to an output shaft of the engine 1, driven wheels 8, a driving shaft 7 for rotating and thus driving the driven wheels 8 a differential gear 6 for transmitting a driving force of the engine 1 to the driving shaft 7, an intake pipe 11 for letting air into the engine 1, an exhaust pipe 14 for letting out exhaust gas from the engine 1, fuel injection valves 15 for injecting the fuel into cylinders, an oil pressure circuit 17 for operating the CVT 2, a control valve 18 of the transmission for controlling the oil pressure circuit 17, an engine control unit 30, a CVT control unit 40, and vehicle weight sensor 27 for detecting the weight W of the vehicle mounted on a suspension (not shown).

Further, a crank angle sensor 23 for detecting the number of rotations of a crank shaft or the output shaft of the engine 1 is mounted on the engine 1.

The CVT 2 includes a torque converter 3 connected to the crank shaft of the engine 1 and a non-step gear mechanism 4 connected to the output shaft of the torque converter 3.

The torque converter 3 includes a pump 3a directly connected to the crank shaft of the engine 1, a turbine 3b directly connected to the input shaft of the non-step gear mechanism 4, and a stator 3c provided through oil between the pump 3a and the turbine 3b.

The non-step gear mechanism is comprised of a primary pulley 19 for receiving a driving force from the torque converter 3, a secondary pulley 20 for transmitting a driving force to the driven wheels 8, and a metal belt 9 for transmitting the driving force received by the primary pulley 19 to the secondary pulley 20. In the non-step gear mechanism 4 according to the present embodiment, the diameter of the primary pulley 19 can be changed by the oil pressure circuit 17. The rpm ratio of the primary pulley 19 to the secondary pulley 20 or the gear ratio changes as the diameter of the primary pulley changes. The non-step gear mechanism 4 includes a primary rpm sensor 29 for detecting the primary rpm Np, the number of rotations of the primary pulley 19, and a secondary rpm sensor 26 for detecting the secondary rpm Ns, the number of rotations of the secondary pulley 20. The secondary rpm Ns is proportional to the vehicle speed.

The intake pipe 11 is provided with an air cleaner 10 for purifying an air, an idle speed valve 13 for adjusting an amount of the air passing through the intake pipe 11, a throttle valve 12 for adjusting an amount of the air passing through the intake pipe 11 according to an accelerating pedal (not shown), an air flow sensor 21 for detecting the amount Qa of the air passing through the intake pipe 11, and a throttle opening sensor 22 for detecting the opening Tvo of the throttle valve 12. In this embodiment of the present invention, the throttle valve 12 is constructed so as to gang mechanically with the accelerating pedal. An amount of the control of the accelerating pedal substantially equally corresponds to the opening Tvo of the throttle valve. If, therefore, the amount of the control of the accelerating pedal is 0, then the opening Tvo of the throttle valve is also 0 (a state in which the throttle valve is fully closed). Accordingly, the amount of the control of the accelerating pedal can be indirectly detected by detecting the opening Tvo of the throttle valve. The intake pipe includes a by-pass pipe (not shown) to maintain an idling state even when the opening of the throttle valve is 0.

Figure 2:
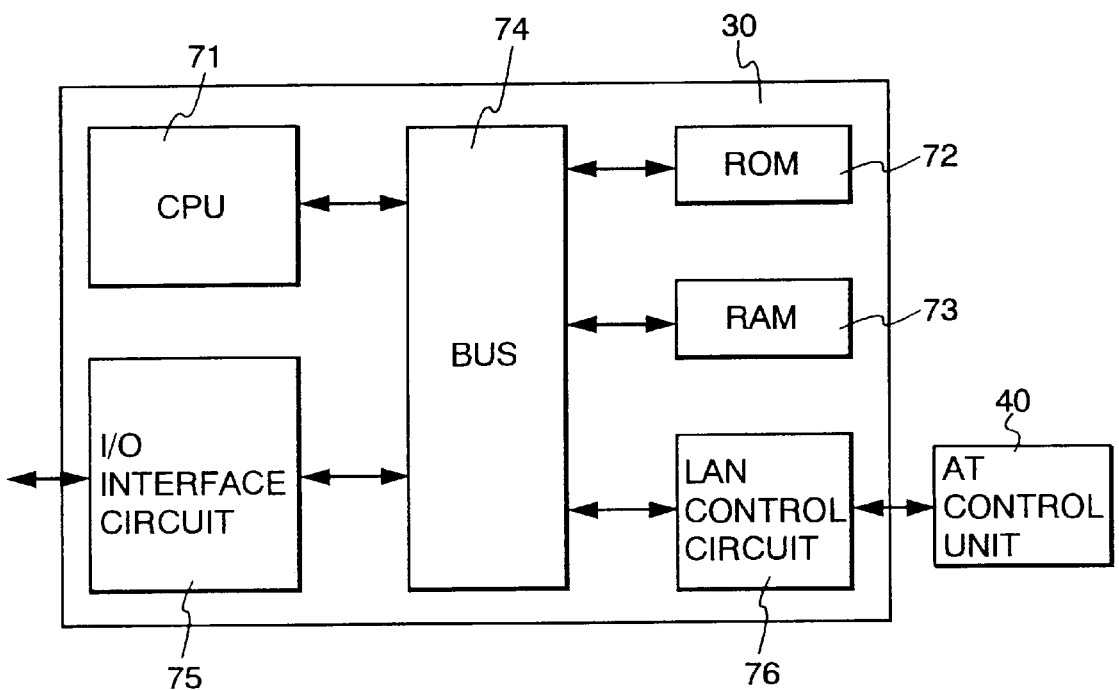
FIG. 2 is a block diagram showing the hardware configuration of an engine control unit.

FIG. 2 is a block diagram showing the hardware configuration of an engine control unit. As shown in FIG. 2, the engine control unit 30 is provided with a CPU 71 for carrying out various kinds of calculations, a ROM 72 in which various kinds of data and programs by which the CPU 71 carries out calculations are stored, a RAM 73 for storing temporarily data, an input/output interface circuit 75 for receiving signals from various kinds of sensors and outputting various kinds of values, a LAN control circuit 76 for transmitting to and receiving from the AT control unit 40, and a BUS 74 connecting devices which make up the engine control unit 30, for transmitting signals to and receiving signals from the devices. The engine control unit 30 controls the fuel injection valves 15, the idle speed valve 13 and an ignition circuit (not shown) based on information from the air flow sensor 21, the throttle opening sensor 22, the crank angle sensor 23 and the AT control unit.

The AT control unit 40 controls an operating valve 18 for the transmission based on information from the primary rpm sensor 29, the secondary rpm sensor 26, the vehicle weight sensor 27, the AT oil temperature sensor 28 and the engine control unit 30. The hardware configuration of the AT control unit 40 is basically the same as that of the engine control unit 30 shown in FIG. 2.

Figure 3:
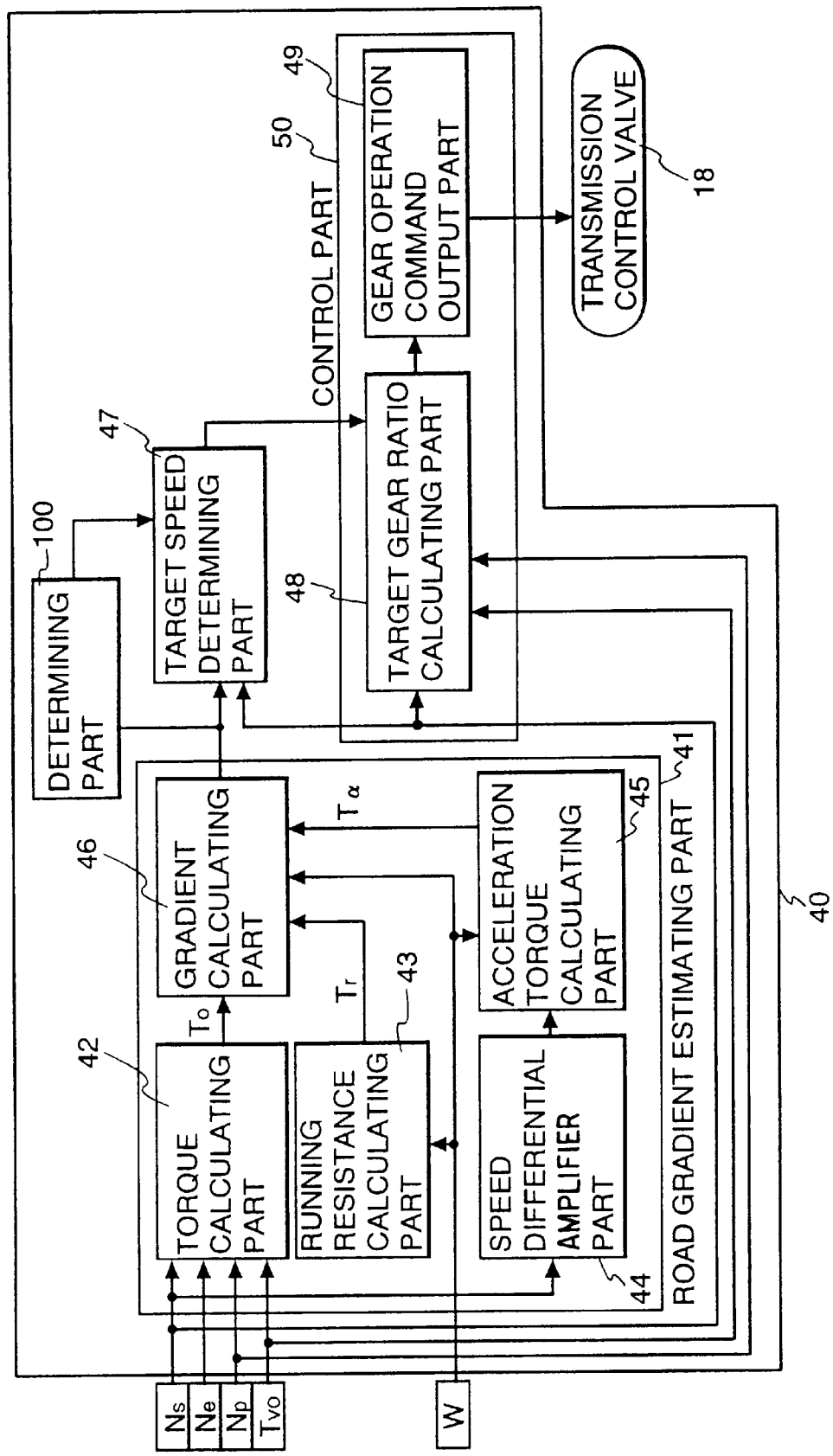
FIG. 3 is a functional view showing the configuration of an AT (automatic transmission) control unit.

FIG. 3 is a functional view showing the configuration of an AT (automatic transmission) control unit 40. As shown in FIG. 3, the AT control unit includes a road gradient estimating part 41 for estimating the gradient (sin θ) of the road on which the vehicle is running, a determining part 100, a target speed determining part 47, and a control part 50 for controlling the transmission operating valve 18.

The road gradient estimating part 41 includes a torque calculating part 42 for calculating a torque To of the driving shaft 7 which drives the driven wheels 8, a running resistance calculating part 43 for calculating a flat road running resistance torque Tr, a speed differential amplifier part 44, an acceleration torque calculating part 45 for calculating an acceleration torque T α and a gradient calculating part 46.

The torque calculating part 42 calculates the driving shaft torque To based on the primary rpm Np from the primary rpm sensor 29, the secondary rpm Ns from the secondary rpm sensor 26, the information identifying the engine speed Ne from the crank angle sensor 23 and the throttle opening Tvo from the throttle opening sensor 22.

Figure 4:
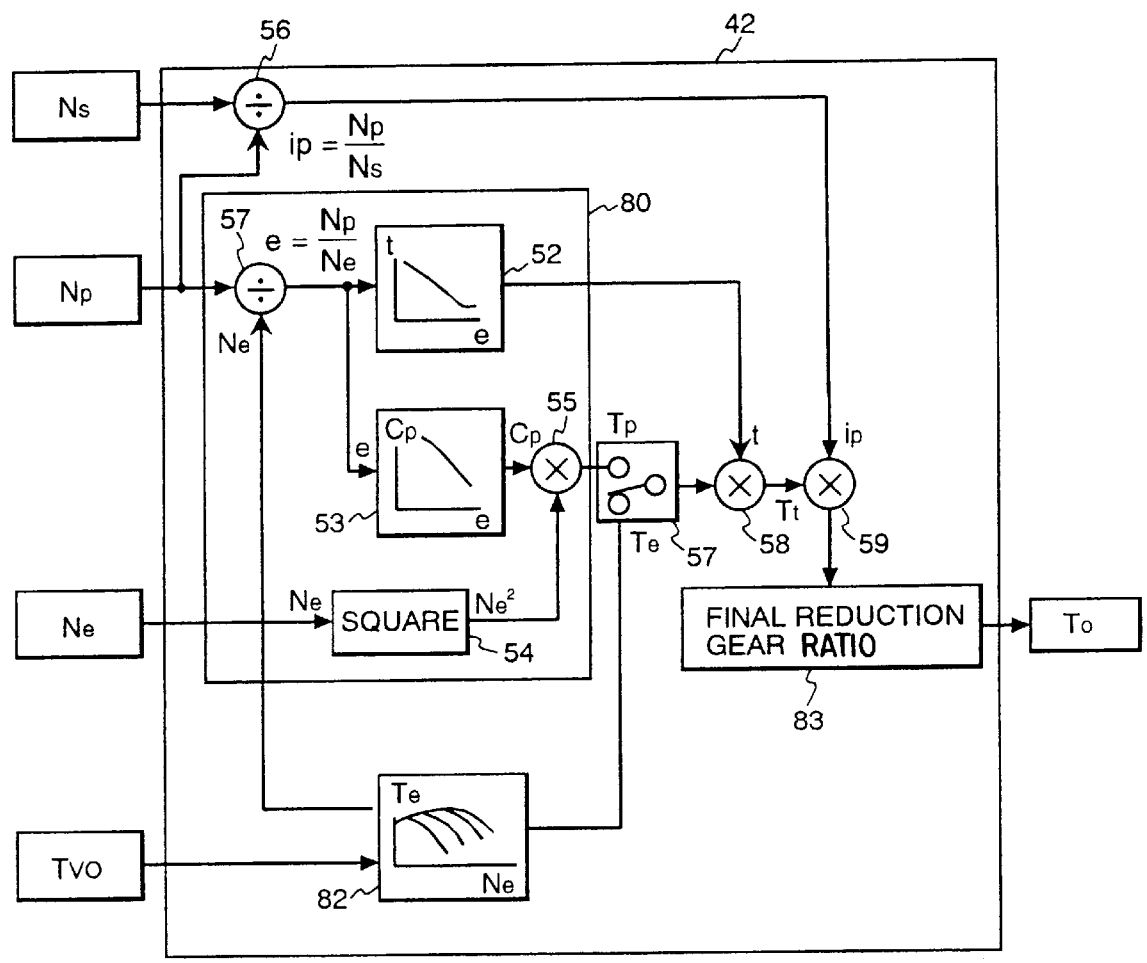
FIG. 4 is a functional view showing the configuration of a torque calculating part.

FIG. 4 is a functional view showing the configuration of a torque calculating part 42. As shown in FIG. 4, the torque calculating part 42 includes a divider part 56 for calculating the gear ratio ip for a pulley, a pump torque calculating part 80 for calculating the pump torque Tp input to the pump 3a of the torque converter 3, a selector part 60, and multipliers 58, 59 and 83.

The divider part 56 calculates the gear ratio ip (=Np/Ns) by dividing the primary rpm Np by the secondary rpm Ns.

The pump torque calculating part 80 includes a divider part 57, a torque ratio calculating part 52 for calculating the torque ratio t of the torque in the input-side (pump 3a) of the torque converter 3 to that in the output-side (turbine 3b) thereof, a pump capacity coefficient calculating part 53 for calculating the pump capacity coefficient Cp of the torque converter 3, and multipliers 54 and 55.

The divider part 57 calculates the speed ratio or slip ratio e (=Np/Ne) of the torque converter 3 by dividing the primary rpm Np by the engine speed Ne.

Figure 7:
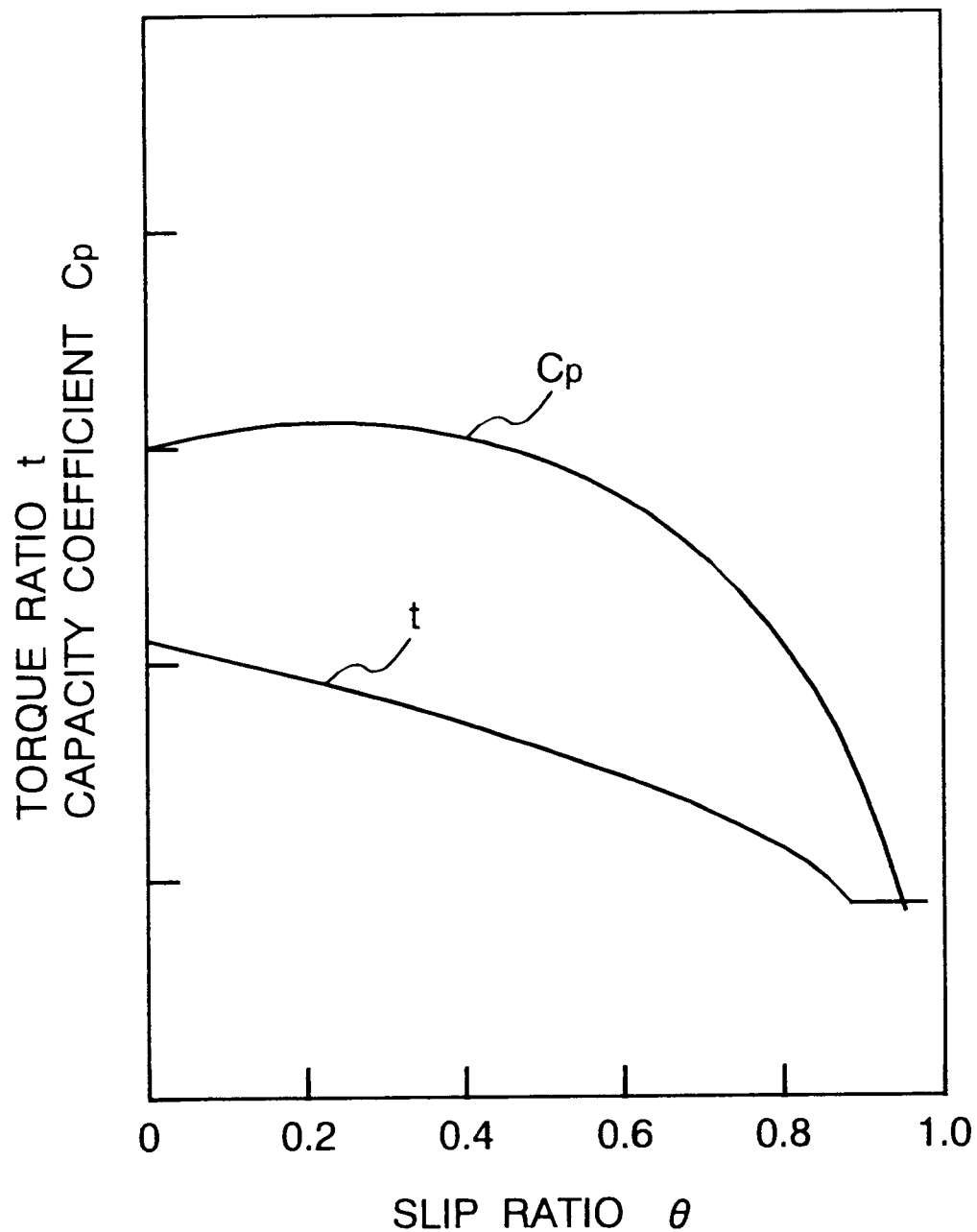
FIG. 7 is a graph showing the relationship between a slip ratio and a torque ratio, and that between the slip ratio and a capacity coefficient Cp.
Figure 8:
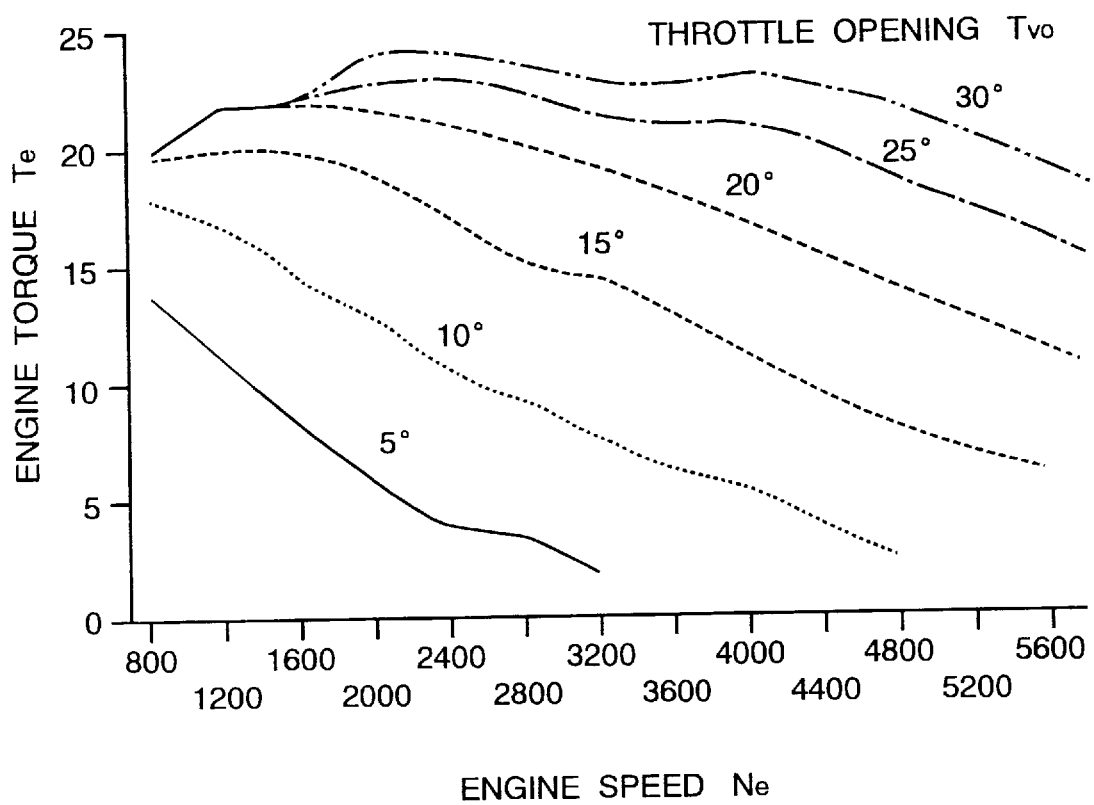
FIG. 8 is a graph showing the relationship among an engine speed Ne, an engine torque Te, and a throttle opening Tvo.

The torque ratio calculating part 52 calculates the torque ratio t corresponding to the speed ratio e calculated by the divider part 57, by using a map shown in FIG. 7 which represents the relationship between the torque ratio t and the speed ratio e of the torque converter 3. Further, the pump capacity coefficient calculating part 53 calculates the pump capacity coefficient Cp corresponding to the speed ratio e calculated by the divider part 57, by using a map shown in FIG. 7 which represents the relationship between the pump capacity coefficient Cp and the speed ratio e of the torque converter 3.

The multiplier part 54 calculates $Ne^2$ by squaring the engine speed Ne. The multiplier part 55 multiplies the pump capacity coefficient Cp obtained by the pump capacity coefficient calculating part 53 by $Ne^2$ calculated by the multiplier 54, and obtains the torque Tp ($=Cp \cdot Ne^2$) of the pump.

The engine torque calculating part 82 calculates the engine torque Te corresponding to the engine speed Ne detected by the crank angle sensor 23 and the throttle opening Tvo detected by the throttle opening sensor 22, by using a map which represents the relationship among the engine torque Te, the throttle opening Tvo and the engine speed Ne of the engine 1. While the map which represents the relationship among the engine torque Te, the throttle opening Tvo and the engine speed Ne of the engine 1 is used in this example it can also use a physical quantity having a correlation between the throttle opening and the physical quantity itself, for example, the air amount Qa passing through the intake pipe 11 detected by the air flow sensor 21 or the amount of the fuel injected from the fuel injection valve 15 controlled by the engine control unit 30. The selector part selects either one of the pump torque Tp calculated by the pump torque calculating part 80 and the engine torque Te calculated by the engine torque calculating part 82. The selected value is used to calculate the torque To of the driving shaft. In this embodiment, if the speed ratio e of the torque converter 3 calculated by the divider part 57 is less than the predetermined value (e.g. before and after 0.9), then the pump torque Tp is selected, otherwise, the engine torque Te is selected. The reason for the selection is as follows.

There is the possibility that the torque converter 3 may be locked up when the speed ratio e is relatively large. It is impossible to calculate the pump capacity coefficient Cp from the speed ratio e with a high accuracy in such a case. Here, since the pump 3a of the torque converter 3 is directly connected to the output shaft of the engine 1, the torque Tp of the pump is substantially the same as that of the engine 1. However, if an air conditioner installed in the vehicle is working, the torque Tp of the pump becomes smaller than the torque Te of the engine 1 by the torque required to operate the air conditioner. Accordingly, the following processing is performed in this embodiment. If the speed ratio e of the torque converter 3 is smaller than the predetermined value, namely, if an error included in the pump torque Tp calculated by the pump torque calculating part 80 is smaller than the torque required to operate the air conditioner, the torque To of the driving shaft is calculated by using the pump torque Tp calculated by the pump torque calculating part 80. While, if the speed ratio e of the torque converter 3 is larger than the predetermined value, namely, if an error included in the pump torque Tp calculated by the pump torque calculating part 80 is larger than the torque required to operate the air conditioner, the torque To of the driving shaft is calculated by using the engine torque Te calculated by the engine torque calculating part 82.

The multiplier part 58 multiplies the pump torque Tp or the engine torque Te selected by the selector part 57 by the torque ratio t of the torque converter 3 calculated by the torque ratio calculating part 52, and obtains the turbine torque Tt (=Tp·t or Te·t) output from the turbine 3b of the torque converter 3. The turbine torque Tt corresponds to an input torque of the CVT 2.

The multiplier part 59 multiplies the turbine torque Tt calculated by the multiplier part 58 by the speed ratio ip calculated by the multiplier part 56, and obtains the output torque of the CVT 2.

The multiplier part 83 multiplies the output torque of the CVT 2 calculated by the multiplier part 59 by a final deceleration ratio if, and obtains the torque To (=Tt·ip·if) of the driving shaft.

The running resistance calculating part 43 calculates a flat road running resistance torque Tr based on the secondary rpm Ns from the secondary rpm sensor 26 and the vehicle weight W from the vehicle weight sensor 27. The flat road running resistance torque Tr is represented by the following equation.

$$Tr=(\mu r \cdot W + ka \cdot V2) \cdot Rt \tag{1}$$

Where $\mu r$: rolling friction coefficient ka: air resistance coefficient

Rt: actual radius of tire

V: vehicle speed

The vehicle speed is correlated to the secondary rpm Ns, and has a value identified by the secondary rpm Ns. While in this embodiment the vehicle weight is detected by the vehicle weight sensor 27, it may use the standard vehicle weight, for example, the weight of the vehicle with two passengers on board, without detecting the vehicle weight by using the weight sensor 27. Further, the vehicle weight may be estimated due to the change between the vehicle speed at a certain time and that at another time.

The vehicle speed differential amplifier part 44 obtains the acceleration $\alpha$ by time-differentiating the vehicle speed identified by the secondary rpm Ns. The acceleration torque calculating part 45 calculates the acceleration resistance torque T $\alpha$ based on the acceleration $\alpha$ obtained by the vehicle speed differential amplifier part 44 and the vehicle weight W from the vehicle weight sensor 27. The acceleration resistance torque T $\alpha$ is represented by the following equation.

$$T\alpha=(W+Wk)\cdot\alpha\cdot Rt/g \tag{2}$$

Where

Wk: rotation inertia weight

Rt: actual radius of tire g: acceleration of the gravity

While the acceleration is obtained by time-differentiating the secondary rpm Ns detected by the secondary rpm sensor 26 in this embodiment, it may obtain directly the acceleration by mounting an acceleration sensor on the vehicle.

The gradient calculating part 46 calculates the gradient sin $\theta$ of the road on which the vehicle is running, based on the driving shaft torque To calculated by the driving torque calculating part 42, the flat road running resistance torque Tr calculated by the running resistance calculating part 43, the acceleration resistance torque T $\alpha$ calculated by the acceleration torque calculating part 45, and the vehicle weight W from the vehicle weight sensor 27.

Figure 5:
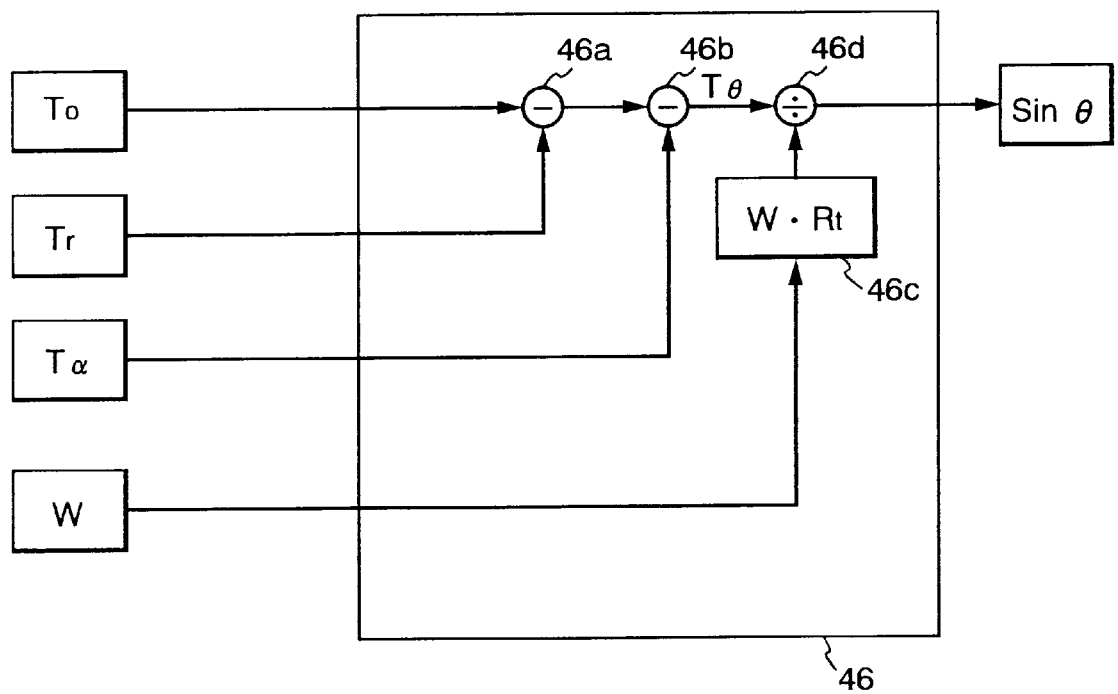
FIG. 5 is a functional view showing the configuration of a gradient calculating part.

FIG. 5 is a functional view showing the configuration of a gradient calculating part 46. The relationship among the driving shaft torque To, the flat road running resistance torque Tr, the acceleration resistance torque T $\alpha$ and the road gradient torque T $\theta$ is as follows.

$$To=Tr+T\alpha+T\theta \tag{3}$$

In the gradient calculating part 46 of this embodiment, a subtractor 46a subtracts the flat road running resistance torque Tr from the driving shaft torque To, and then a subtractor 46b subtracts the acceleration torque $\alpha$. As a result, the road gradient torque T $\theta$ is obtained.

The road gradient torque T $\theta$ is represented by the following equation.

$$T\theta=W\cdot\sin\theta\cdot Rt \tag{4}$$

In the gradient calculating part 46 of this embodiment, a multiplier part 46c multiplies the vehicle weight W from the vehicle weight sensor 27 by the actual radius Rt of the tire, and a divider part 46d the road gradient torque T $\theta$ calculated by the multiplier part 46b by W·Rt calculated by the multiplier part 46c. As a result, the gradient sin $\theta$ of the road on which the vehicle is running is obtained. If sin $\theta$ indicates plus(+), the vehicle is running on a uphill slope, otherwise, the vehicle is on a downhill slope.

A determining part 100 determines whether or not the absolute value of the road gradient estimated by the road gradient estimating part 41 is more than the predetermined threshold value (for example, |sin 3.5°| corresponding to 6% gradients). If the absolute value is more than the threshold value, then a signal is output to the target speed determining part 47. A sign determining part for determining the sign of sin $\theta$ output from the road gradient estimating part 41 may be provided in the determining part 100. In such a case, different threshold values are used according to whether the determined sign indicates plus or minus, namely, the vehicle is running uphill or downhill.

The target speed determining part 47 determines a target secondary rpm Nst, based on the road gradient sin $\theta$ calculated by the gradient calculating part 46 and the secondary rpm Ns from the secondary rpm sensor 26 while the signal from the determining part 100 is input. As mentioned above, since the secondary rpm Ns is proportional to the vehicle speed, the target vehicle speed can be identified by the target secondary rpm Nst.

Firstly, the target speed determining part 47 fetches a secondary rpm Nsa when the signal from the determining part 100 is input, namely, when the absolute value of the road gradient sin $\theta$ is more than the predetermined threshold value. Secondly, the target secondary rpm Nst is obtained on the basis of the secondary rpm Nsa. The target secondary rpm Nsa is represented by the following equation.

$$Nst = k \cdot Nsa \quad (5)$$

Where, k is a constant identified by the secondary rpm Nsa, and it becomes smaller as the secondary rpm Nsa becomes larger. In this embodiment, k is set so as to satisfy $0 < k \leq 1$.

The control unit 50 includes a target gear ratio calculating part 48 and a gear operation command output part 49 as shown in FIG. 3. If it is determined by the determining part 100 that the absolute value of the road gradient $\sin \theta$ is more than the predetermined threshold value, namely, the target secondary rpm Nst is calculated by the target speed determining part 47, the target gear ratio calculating part 48 obtains the target gear ratio ipt (=Np/Nst), based on the target secondary rpm Nst and the current primary rpm Np from the primary rpm sensor 29.

While, if it is determined by the determining part 100 that the absolute value of the road gradient $\sin \theta$ is less than the predetermined threshold value, namely, the target secondary rpm Nst is not calculated by the target speed determining part 47, a general control method of the CVT as mentioned above in the Background of the Invention is used.

The target primary rpm Npt corresponding to the current secondary rpm Ns from the secondary rpm sensor 26 and the current throttle opening Tvo from the throttle opening sensor 22 is obtained on the basis of the gear schedule shown in FIGS. 9A and 9B. Next, the target gear ratio ipt (=Npt/Ns) is obtained from the target primary rpm Npt and the current secondary rpm Ns.

The gear operation command output part 49 determines an amount of the control of the gear ratio control valve 18 based on the target gear ratio ipt calculated by the target gear ratio calculating part 48, and controls the gear ratio control valve 18. Thereby, the radius of the primary pulley 19 of the CVT 2 is changed by the oil pressure circuit 17, and thus the gear ratio is controlled so as to match up to the target gear ratio ipt.

Figure 6:
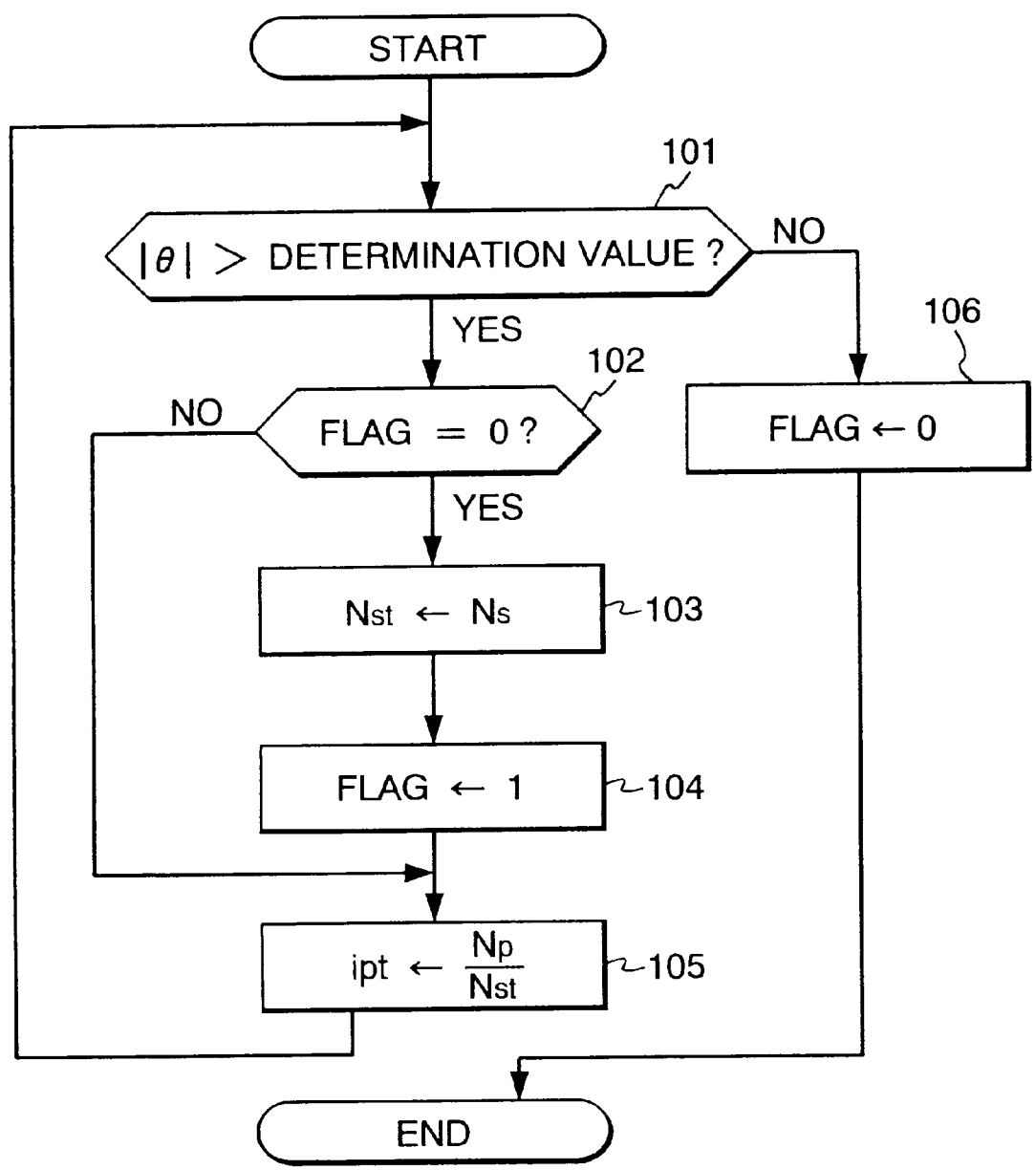
FIG. 6 is a flow chart illustrating the operation of the AT controller.

Next, the operation of the AT controller will be explained with reference to FIG. 6. FIG. 6 is a flow chart illustrating the operation of the AT controller 40.

Firstly, in step 101, it is determined whether or not the absolute value of the road gradient $\sin \theta$ from the road gradient estimating part 41 is more than the predetermined threshold value pre-stored in a memory. If it is determined that the absolute value of the road gradient $\sin \theta$ is more than the predetermined threshold value, then the process advances to step 102. In step 102, it is determined whether or not a flag is 0. If the flag is "0", then it means that the road gradient $\theta$ became more than the predetermined threshold value at first, and if the flag is "1", it means that the road gradient $\theta$ has already become more than the predetermined threshold value. If it is determined in step 102 that the flag is "0", then the process advances to step 103. In step 103, the target secondary rpm Nst is obtained, based on the secondary rpm Nsa from the secondary rpm sensor 26 when the absolute value of the road gradient $\sin \theta$ is more than the predetermined threshold value, and stored in the memory. Next, the flag is changed to "1" in step 10, and then the process advances to step 105. While, if it is determined that the flag is not "0" in step 102, then the process branches to step 105.

In step 105, the target gear ratio ipt is calculated based on the current primary rpm Np from the primary rpm sensor 29 and the target secondary rpm Nsa, and the gear ratio of the CVT 2 is controlled so as to match up to the target gear ratio ipt.

The above process from step 102 to step 105 is repeated until it is determined that the absolute value of the road gradient $\sin \theta$ is less than the predetermined threshold value in step 101. If it is determined in step 101 that the absolute value of the road gradient $\sin \theta$ is less than the predetermined threshold value, then the flag is reset to "0" in step 106, the flow shown in FIG. 6 ends.

In this embodiment, if the absolute value of the road gradient $\sin \theta$ is more than the predetermined threshold value, the target secondary rpm Nst is determined based on the secondary rpm Nsa detected when the absolute value of the road gradient $\sin \theta$ is more than the predetermined threshold value. Further, the gear ratio of the CVT is controlled so as that the secondary rpm Ns of the CVT 2 matches up to the target secondary rpm Nst. According to this embodiment, effective engine braking suitable for a road gradient can be automatically applied on the downhill and effective driving force suitable for the road gradient can be automatically obtained on the uphill, since it is possible to maintain the speed of a vehicle while running on the slope at the speed determined in accordance with the vehicle speed at the time it enters into the slope.

In this embodiment, the target secondary rpm Nst is set to a value obtained by multiplying the secondary rpm Nsa detected when the absolute value of the road gradient $\sin \theta$ is more than the predetermined threshold value by the coefficient k corresponding to the secondary rpm Nsa. According to this embodiment, it is possible to maintain the vehicle speed when the vehicle is running on a slope at an appropriate speed even if the entering speed to the slope is too fast.

In this embodiment, the vehicle driving torque is obtained based on the engine speed Ne, the primary rpm Np and the secondary rpm Ns. Further, the running resistance torque Tr and the acceleration torque $T \alpha$ is obtained based on the secondary rpm Ns and the vehicle weight W. The road gradient torque $T \theta$ is obtained by subtracting the running resistance torque Tr and the acceleration torque $T \alpha$ from the vehicle driving torque To, and the road gradient $\sin \theta$ is obtained based on the road gradient torque $T \theta$. The primary rpm Np and the secondary rpm Ns are information required to control the automatic transmission both in the step type and non-step type transmissions. Generally, a driver can know the engine speed Ne as one of the information indicative of a state of the vehicle. While the vehicle weight can be detected by the sensor mounted on the vehicle, it should be appreciated that the vehicle weight may be preset if the change in the vehicle weight is relatively small.

While the described embodiment represents the currently preferred form of the present invention, it is to be understood that modifications will occur to those skilled in that art without departing from the spirit of the invention. In the above embodiment, the target secondary rpm Nst is set to a value obtained by multiplying the secondary rpm Nsa detected when the absolute value of the road gradient $\sin \theta$ is more than the predetermined threshold value by the coefficient k corresponding to the secondary rpm Nsa. However, the present invention is not limited to that embodiment.

For example, the target secondary rpm Nst may be set to a value obtained by multiplying the secondary rpm Nsa detected when the absolute value of the road gradient $\sin \theta$ is more than the predetermined threshold value by the coefficient q corresponding to the absolute value of the road gradient $\sin \theta$. Where, desirably the coefficient q becomes smaller as the road gradient becomes steeper. Preferably, it should be set to $0 < q \leq 1$. In such a case, it is possible to control the vehicle speed in accordance with the change in the gradient of the road on which the vehicle is running.

Further, it is possible to maintain the vehicle speed on a slope at an appropriate speed, even if the road gradient is relatively steep.

Furthermore, the target secondary rpm Nst may be set to a value obtained by multiplying the secondary rpm Nsa detected when the absolute value of the road gradient sin θ is more than the predetermined threshold value by the coefficient k corresponding to the secondary rpm Nsa and the coefficient q corresponding to the absolute value of the road gradient sin θ. In this case, it is possible to control the vehicle speed in accordance with both the vehicle speed at the time the vehicle enters a slope and the change in the gradient of the road on which the vehicle is running.

Next, a second embodiment of the present invention will be explained with reference to the drawings.

Figure 10:
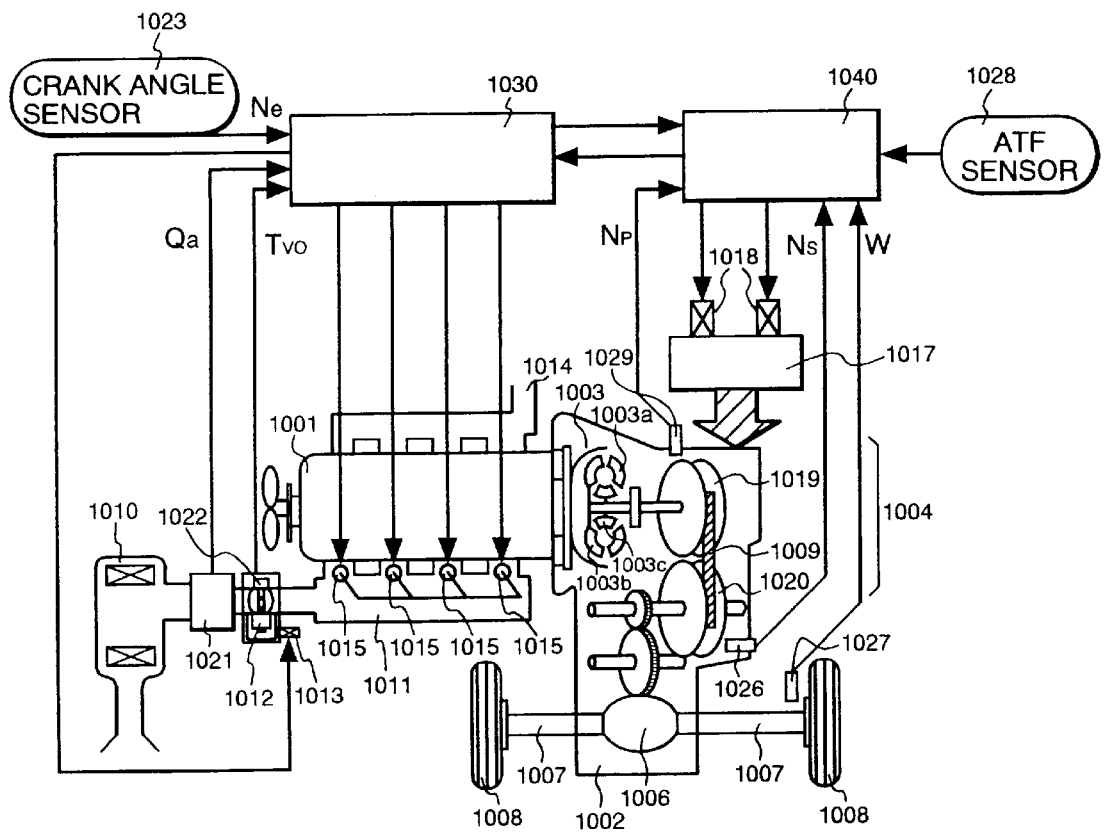
FIG. 10 is a schematic view showing the fundamental configuration of the CVT system according to a second embodiment of the present invention.

FIG. 10 shows the hardware configuration of a control system of the CVT system according to a second embodiment of the present invention.

The present CVT system is provided with an engine 1001, a non-step type automatic transmission (CVT) 1002 for transmitting an output of the engine 1001 to driven wheels 1008 through a driving shaft 1007, a differential gear 1006 and a propeller shaft 1005, various sensors for detecting a state of a vehicle, a CVT control unit (ECU for a CVT) 1040 for controlling the CVT 1002 according to outputs of the sensors, and an engine CVT control unit (ECU for a CVT) 1040 for controlling the CVT 1002 according to outputs of the sensors. As various sensors, there are a primary rpm sensor 1029 for detecting a primary rpm Np of a primary pulley (input-side pulley) 1019, a secondary rpm sensor 1026 for detecting a secondary rpm Ns of a secondary pulley (output-side pulley) 1019, an air flow sensor 1021 for detecting an amount Qa of the air purified by an air cleaner 1010 which passes through an air intake manifold 1011, a throttle opening sensor 1022 for detecting the opening TVO of a throttle valve 1012, a crank angle sensor 1023 for detecting the number of rotations (engine speed) of a crankshaft of the engine, an oxygen sensor 1028 for detecting the concentration of the oxygen in an exhaust gas emitted from an exhaust manifold 1014, and a vehicle weight sensor 1027 mounted on a suspension (not shown) for detecting the weight of the vehicle.

The CVT 1002 controlled by the ECU 1040 for the CVT includes a torque converter 1003 directly connected to the crank shaft of the engine 1, and a non-step type transmission directly connected to an output shaft of the torque converter 1003. Further, the torque converter 1003 includes a pump 1003a directly connected turbine 1003b directly to the crank shaft of the engine 1001, a turbine 1003a directly connected to the output shaft of the torque converter 1003, and a stator 1003c for controlling a flow of the oil circulated between the pump 1003a and the turbine 1003b in order to increase rotations of the pump 1003a generated by rotations of the crank shaft of the engine 1001. By rotating the turbine 1003b using the oil pressurized and flowed due to the rotations of the pump 1003a, the transmitting torque from the crank shaft of the engine 1001 is amplified and transmitted to the output shaft. The non-step transmission 1014 is configured of the input-side pulley or primary pulley 1019 connected to the turbine 1003b of the torque converter 1003, and the output-side pulley or secondary pulley 1020 connected to the primary pulley 1019 via a metal belt (or a metal chain), in which an arbitrary gear ratio can be obtained by changing a radius of the primary pulley 1019 according to the magnitude of an oil pressure from an oil pressure circuit 1017. A gear control valve 1018 for controlling the oil pressure from the oil pressure circuit 1017 is controlled by a gear operation command output part 1049 of the ECU for the CVT as described later.

The ECU 1030 for the engine and the ECU 1040 for the CVT each is provided with a CPU 1071 for performing various kinds of processing, a ROM 1072 for storing programs identifying various kinds of processing and various kinds of characteristic maps, a RAM 1073 for storing temporally data of the programs and the characteristic maps, an input/output interface circuit 1075 for controlling the input of sensor output signals and the output of control signals, a LAN control circuit 1076 for controlling the data transmission between other control units connected to the LAN and the LAN control circuit itself, and a BUS connecting these equipment to each other. The function of these equipment will be described later.

Next, the configuration of the main function of the ECU 1030 for the engine will be explained briefly. The above configuration of the main function means the data stored in the RAM 1073 and the processing performed by the CPU 1071.

The ECU 1030 for the engine includes various kinds of control units such as a fuel injection control unit for optimizing an air/fuel ratio in an intake side of the engine by controlling the opening of the fuel injection valve 1015 for injecting the fuel into each cylinder of the engine and the opening of the idle speed valve 1013 mounted in the intake manifold 1011, an idle rpm control unit for optimizing the idle rotation speed by controlling an amount of the air which bypasses the intake manifold 1011, and an ignition timing control unit for optimizing the ignition timing of the engine 1001 by controlling an ignition lead angle of an ignitor.

Figure 11:
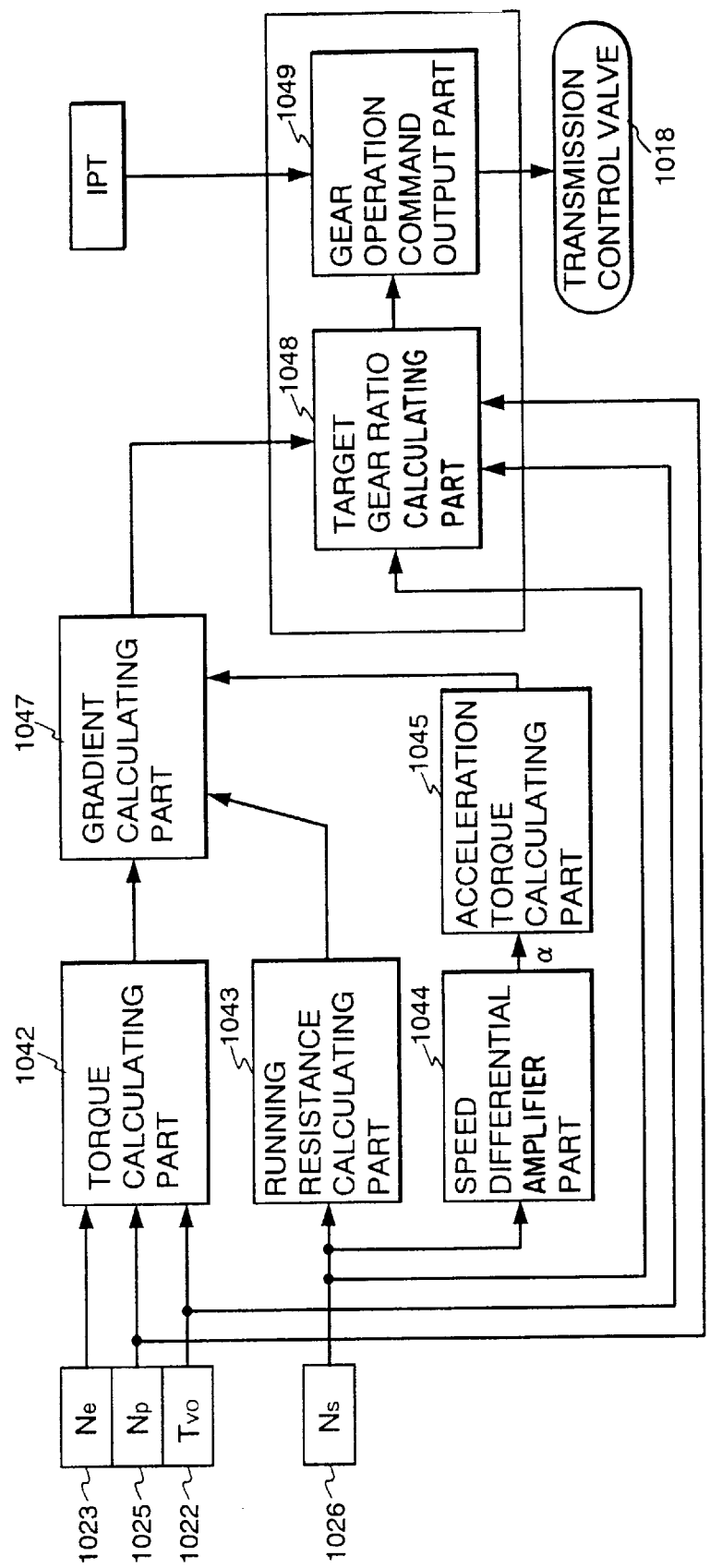
FIG. 11 is a block diagram showing the function of an ECU for the CVT of FIG. 10.

Referring now to FIG. 11, the functional configuration of the ECU 1040 for the CVT will be explained in detail. The above functional configuration means the data stored in the RAM 1073 and the processing performed by the CPU 1071.

The ECU 1040 for the CVT is provided with vehicle speed differential amplifier part 1044 for calculating an acceleration of the vehicle according to outputs of various sensors, an acceleration torque calculating part 1045 for calculating an acceleration resistance torque of the vehicle by using the acceleration of the vehicle calculated by the vehicle speed differential amplifier part 1044 and the outputs of the sensors, a driving torque calculating part 1042 for calculating an output shaft torque of the CVT 1002 by using the outputs of the sensors, a running resistance calculating part 1043 for calculating a flat road resistance torque of the vehicle by using the outputs of the sensors, a gradient calculating part 1047 for calculating a gradient of the road on which the vehicle is running by using the outputs of the above parts 1044, 1049, 1042, 1043, and the outputs of the sensors, a target gear ratio calculating part 1048 for calculating the target gear ratio of the CVT 1002 according to the gradient θ of the road on which the vehicle is running, calculated by the gradient calculating part 1047, and a gear operation command output part 1049 for controlling the gear ratio of the CVT 1002 by using the target gear ratio calculated finally by the target gear ratio calculating part 1048. The processing of the above parts will be explained hereinafter.

Firstly, the processing of the vehicle speed differential amplifier part 1044 will be explained.

The vehicle speed differential amplifier part 1044 converts the secondary rpm Ns detected by the secondary rpm sensor 1026 to a wheel speed V, and then time-differentiates the resultant speed V. As a result, the acceleration α is obtained.

Figure 13:
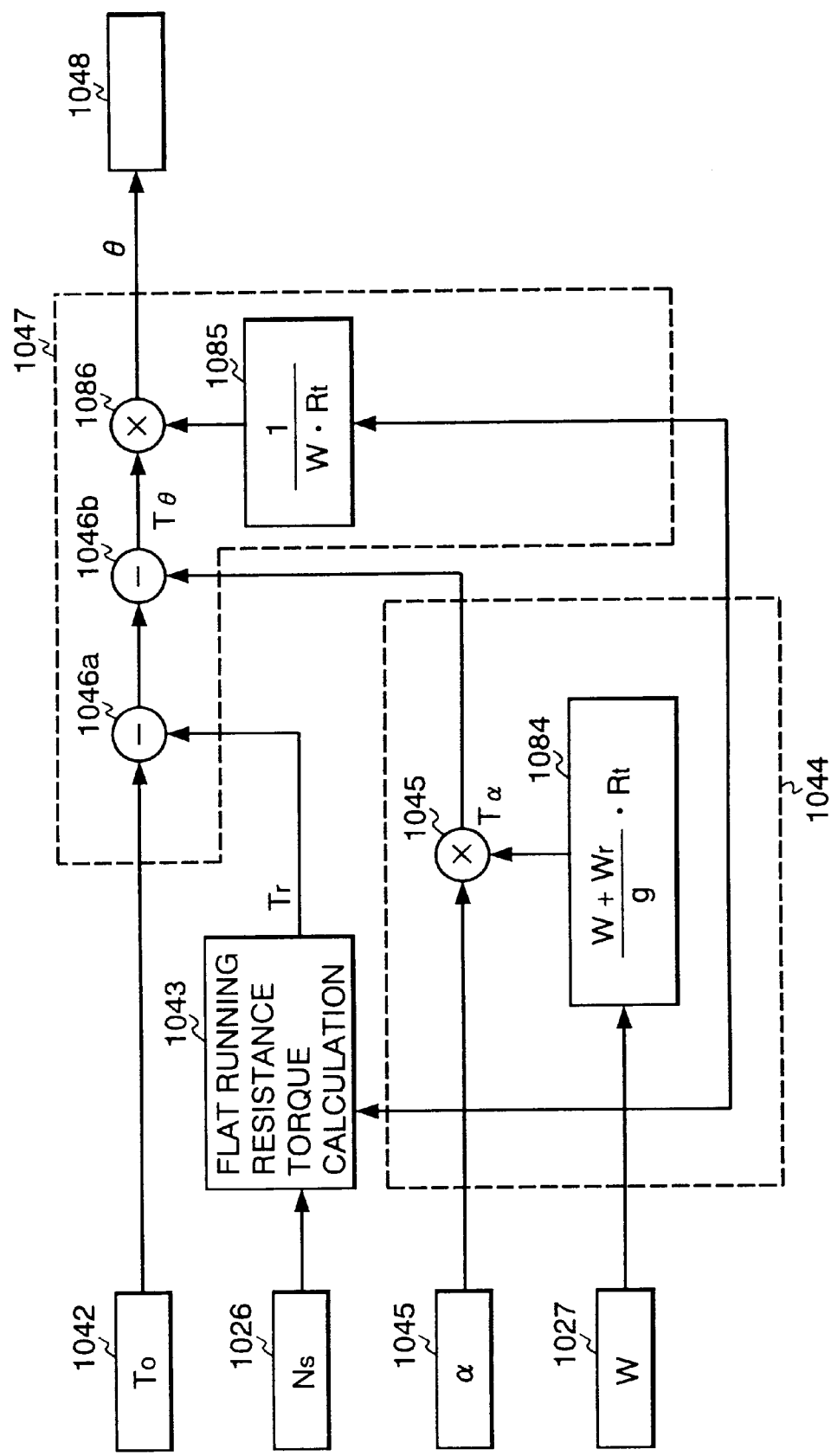
FIG. 13 is a block diagram illustrating the process in which a road gradient is calculated by the ECU for the CVT of FIG. 10.
Figure 14:
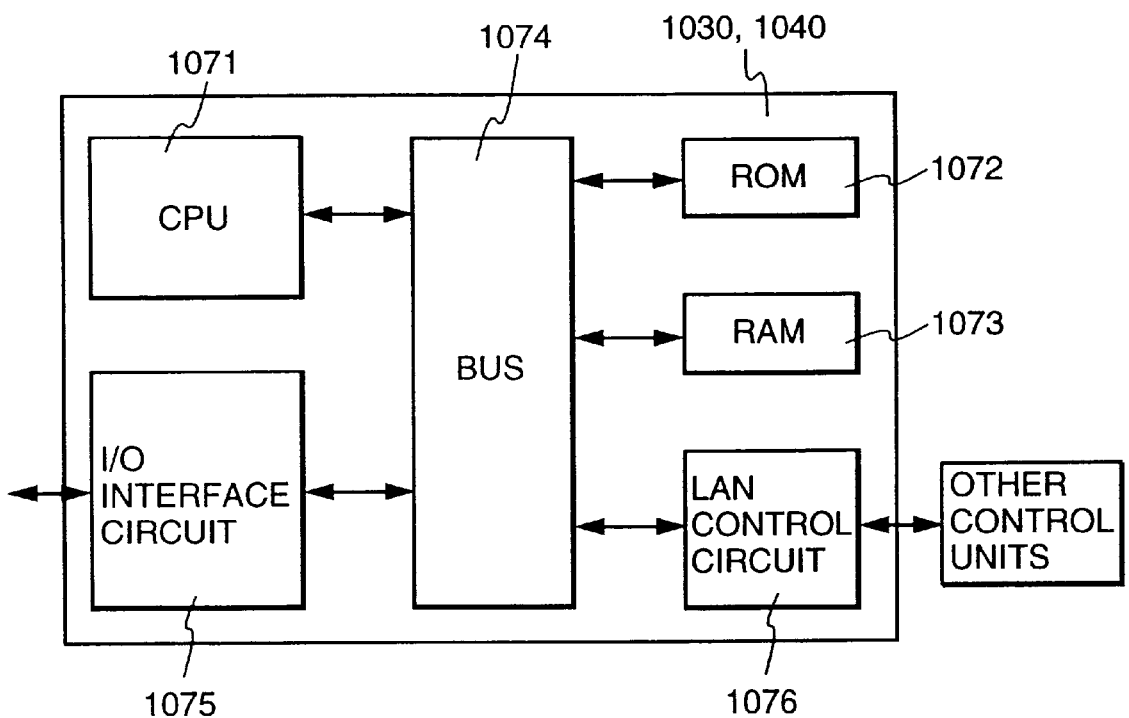
FIG. 14 is a block diagram showing the fundamental configuration of the ECU for the CVT or the engine of FIG. 10.

Referring to FIG. 13, the processing performed by the acceleration torque calculating part 1049 will be explained.

In blocks 1084 and 1045, the acceleration torque T α is calculated using the acceleration calculated by the vehicle speed differential amplifier part 1044, the vehicle weight W sequentially detected by the vehicle weight sensor 1027 and the following equation.

$$T\alpha = (W+Wr)\cdot\alpha\cdot Rt/g \tag{6}$$

Where,
Wr: rotation inertia weight
Rt: radius of tire during run
g: acceleration of the gravity While in this embodiment the acceleration resistance torque T α is calculated using the acceleration α obtained by the above calculation, it may be obtained by using the actual acceleration α detected by the existing acceleration sensor or the newly mounted acceleration sensor. While in this embodiment the acceleration torque T α is calculated using the vehicle weight W sequentially detected by the vehicle weight sensor 1027, if the change in the vehicle weight is relatively small, it is not necessary to use the actual vehicle weight detected by the weight sensor 1027. For example, it may use the standard vehicle weight (a designated seating capacity for 2 passengers) identified by standards. Further, it may estimate the vehicle weight from the acceleration α calculated by the vehicle speed differential amplifier part 1044 when the vehicle is running on the road having a constant gradient at a constant driving torque. With regard to the vehicle weight, the above description can be applied to the following description.

Figure 12:
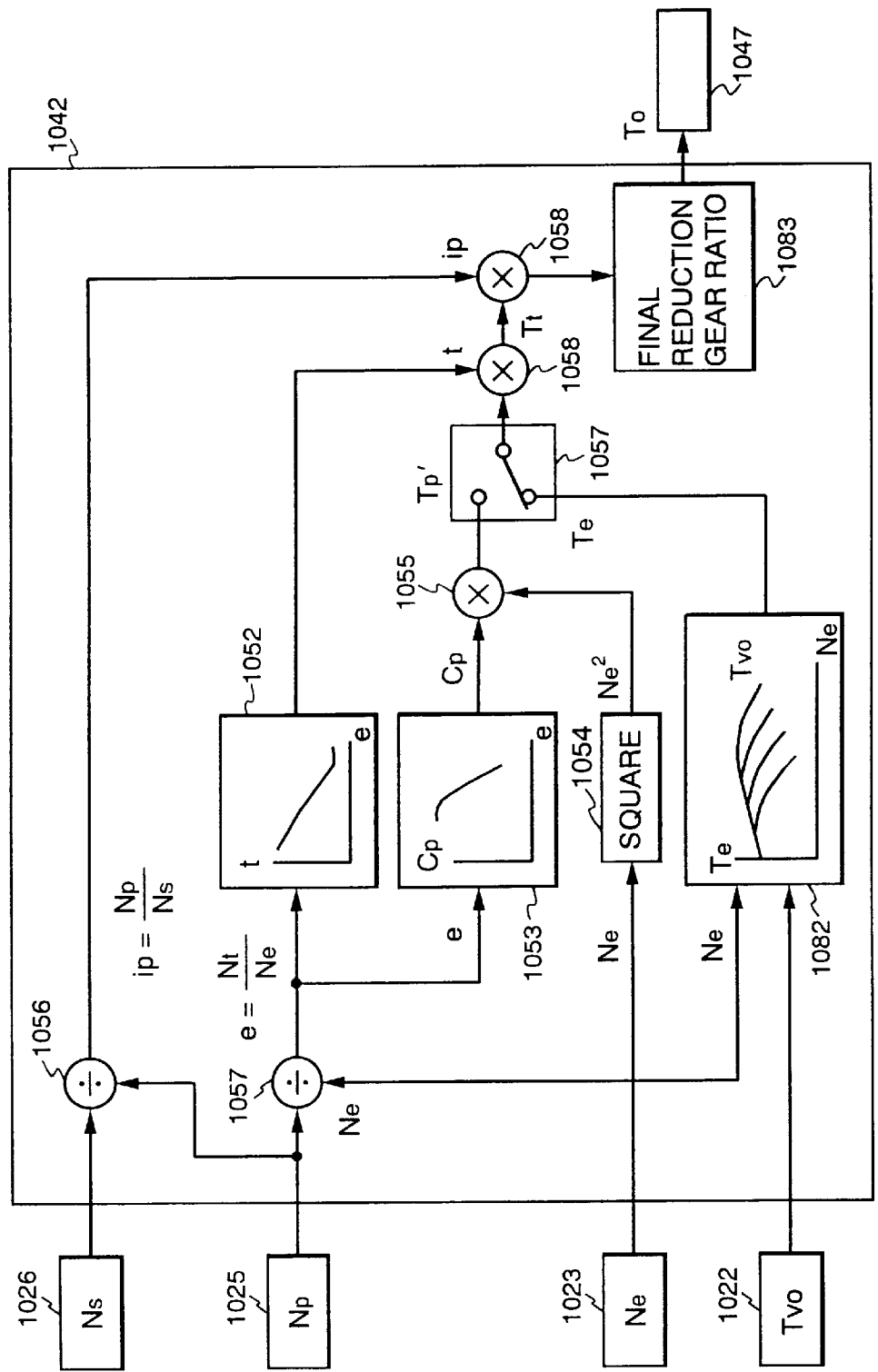
FIG. 12 is a block diagram illustrating the process of the torque calculating part of FIG. 11.

Next, the processing performed by the driving torque calculating part 1042 will be explained with reference to FIG. 12.

In block 1056, the deceleration ratio ip of the CVT 1002 is calculated by using the primary rpm Np detected by the primary rpm sensor 1029, the secondary rpm Ns detected by the secondary rpm sensor 1026 and the following equation.

$$Ip = Np/Ns \tag{7}$$

Further, in block 1082, the engine torque Te corresponding to the throttle opening Tvo detected by the throttle opening sensor 1022 and the engine speed Ne detected by the crank angle sensor 1023 is obtained by using the characteristic map (Ne-Te characteristics) prestored in the RAM 1073. The above characteristic map represents the corresponding information in which the engine speed Ne is uniquely identified by the engine torque Te every throttle opening Tvo.

While, in block 1057, the speed ratio e of the torque converter is calculated by using the primary rpm Np detected by the primary rpm sensor 1029, the engine speed Ne detected by the crank angle sensor 1023 and the following equation.

$$e = Np/Ne \tag{8}$$

In block 1052, the torque ratio t corresponding to the speed ratio e of the torque converter is obtained by using the characteristic map (e-t characteristics) pre-stored in the RAM 1073. Further, in block 1053, the pump capacity coefficient Cp corresponding to the speed ratio e of the torque converter is obtained by using the characteristic map (e-Cp characteristics) pre-stored in the RAM 1072. The above characteristic map (e-t characteristics) represents the corresponding information in which the speed ratio e of the torque converter is uniquely identified by the torque ratio t, and the above characteristic map (e-Cp characteristics) represents the corresponding information in which the speed ratio e of the torque converter is uniquely identified by the pump capacity coefficient Cp.

In block 1055, an input torque Tp' (pump torque) to the torque converter is calculated by using the pump capacity coefficient Cp, the engine speed Ne detected by the crank angle sensor 1023 and the following equation.

$$Tp' = Cp\cdot Ne\cdot Ne \tag{9}$$

Further, in block 1057, a pump torque Te is estimated by selecting either one of the pump torque Tp' calculated in block 1055 and the engine torque Te obtained in block 1082, according to a value of the speed ratio e of the torque converter calculated in block 1052. For example, if the speed ratio e of the torque converter is less than the predetermined value E (ex. 0.9), then the pump torque Tp' calculated by using the equation (9) is estimated as the formal pump torque Tp. Otherwise, the engine torque Te obtained by using the characteristic map (Ne-Te characteristics) is estimated as the pump torque Tp. This is because an error included in the pump capacity coefficient Cp obtained by using the characteristic map (e-Cp characteristics) increases and the resultant error becomes more than the loss of the above torque.

In block 1058, the turbine torque Tt of the torque converter is calculated by using the torque ratio t obtained from the characteristic map (e-t characteristics) in block 1052, the pump torque Tp estimated in block 1057 and the following equation.

$$Tt = Tp\cdot t \tag{10}$$

Finally, in blocks 1059 and 1083, the torque To of the output shaft of the CVT 1002 is calculated by using the turbine torque Tt of the torque converter calculated in block 1058, the deceleration ratio ip of the CVT 1002 calculated in block 1056 and the following equation.

$$To = ip\cdot ipf\cdot Tt \tag{11}$$

where, ipf is the final deceleration ratio of the CVT 1002 pre-stored in a ROM 1072. While in this embodiment the torque To of the output shaft of the CVT 1002 is obtained by using the above calculation, it is not necessary to calculate the torque To of the output shaft of the CVT 1002 by like means. For example, the actual torque To of the output shaft of the CVT 1002 can be detected directly by mounting a torque sensor on the drive shaft 1007.

Next, the processing of the running resistance calculating part 1043 will be explained.

The running resistance calculating part 1043 calculates the flat road running resistance torque Tr by using the vehicle speed V in proportional to the secondary rpm Ns detected by the secondary rpm sensor 1026, the vehicle weight W sequentially detected by the vehicle weight sensor 1027 and the following equation.

$$Tr = (\mu\cdot W + ka\cdot V\cdot V)\cdot Rt \tag{12}$$

Where
$\mu$: A rolling friction resistance coefficient
Rt: radius of tire during run
ka: air resistance coefficient While in this embodiment the flat road resistance torque Tr is calculated by using the vehicle weight W detected by the vehicle weight sensor 1027, the flat road resistance torque Tr may be calculated by using the vehicle weight obtained by a method described above.

The road gradient calculating part 1047 will be explained with reference to FIG. 13.

In blocks 1046 and 1046, the road gradient torque T θ is calculated by using the acceleration torque T α calculated by the acceleration torque calculating part 1045, the flat road resistance torque Tr calculated by the running resistance calculating part 1043, the torque To of the output shaft of the CVT 1002 calculated by the driving torque calculating part 1042 and the following equation.

$$T\theta = To - Tr - T\alpha \tag{13}$$

In blocks 1086 and 1085, the gradient θ of the road on which the vehicle is running is calculated by using the road gradient torque T θ, the approximation (θ≈sin θ) held on the public road and the following equation.

$$\theta \approx \sin\theta = T\theta/(W \cdot Rt) \tag{14}$$

While in this embodiment the gradient θ of the road on which the vehicle is running is calculated by using the vehicle weight W detected by the vehicle weight sensor 1027, the gradient θ of the road on which the vehicle is running may be calculated by using the vehicle weight obtained by a method described with respect to the acceleration torque calculating part 1045.

The processing performed by the target gear ratio calculating part 1048 will be explained next.

Figure 18A:
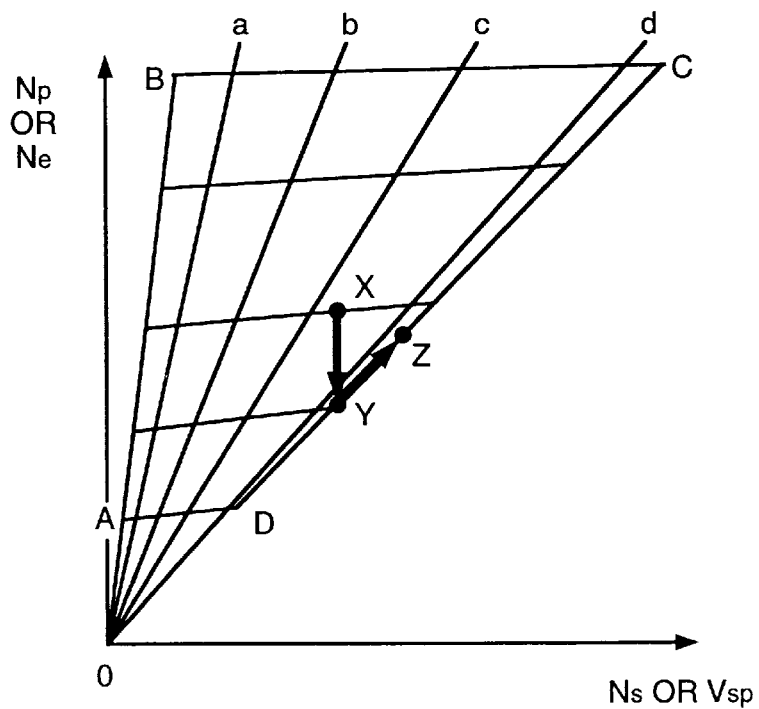
FIG. 18A is a diagram showing the gear schedule in a normal mode.

If the road gradient θ calculated by the road gradient calculating part 1047 is within the predetermined range (A <θ<B, for example, −0.03° <θ0.03°), the target gear ratio calculating part 1048 calculates the ratio of the secondary rpm Ns to the target primary rpm Npt (Ns/Npt) as the target gear ratio ipt, after obtaining the target primary rpm Npt corresponding to the secondary rpm Ns detected by the secondary rpm sensor 1026 and the throttle valve opening VO detected by the throttle opening sensor 1022, in the gear schedule (see FIG. 18A) used in the general gear control method for the CVT. Here, the gear schedule means the corresponding information in which the throttle opening Tvo, the vehicle speed V (or the secondary rpm Ns) and engine rpm Ne (or the primary rpm Np) are related to each other. The CVT can change in non-step the gear ratio within the range surrounded by A-B-C-D-A in the gear schedule.

On the other hand, if the road gradient θ calculated by the running resistance detecting part 1043 is within the predetermined range (A≦θ or θ≦B, for example, −0.03°≦θ or θ≦0.03°), it obtains the target gear ratio ipt corresponding to the road gradient θ calculated by the running resistance detecting part 1043 by using the characteristic map (θ-ipt characteristics) pre-stored in the RAM. Here, the characteristic map (θ-ipt characteristics) represents the corresponding information in which the road gradient θ is related to the target gear ratio ipt of the CVT 1002.

The gear operation command output part 1049 determines an amount of control of the gear control valve 1018 for controlling the oil pressure of the oil pressure circuit 1017 so that the actual gear ratio IPT of the CVT 1002 can match up to the target gear ratio ipt of the CVT 1002 calculated by the target gear ratio calculating part 1048 under the above condition, thereby driving the gear control valve 1018. As a result, the radius of the primary pulley 1020 of the CVT is changed by the oil pressure from the oil pressure circuit 1017, and the gear ratio of the CVT 1002 is changed to match up to the target gear ratio ipt.

Figure 16:
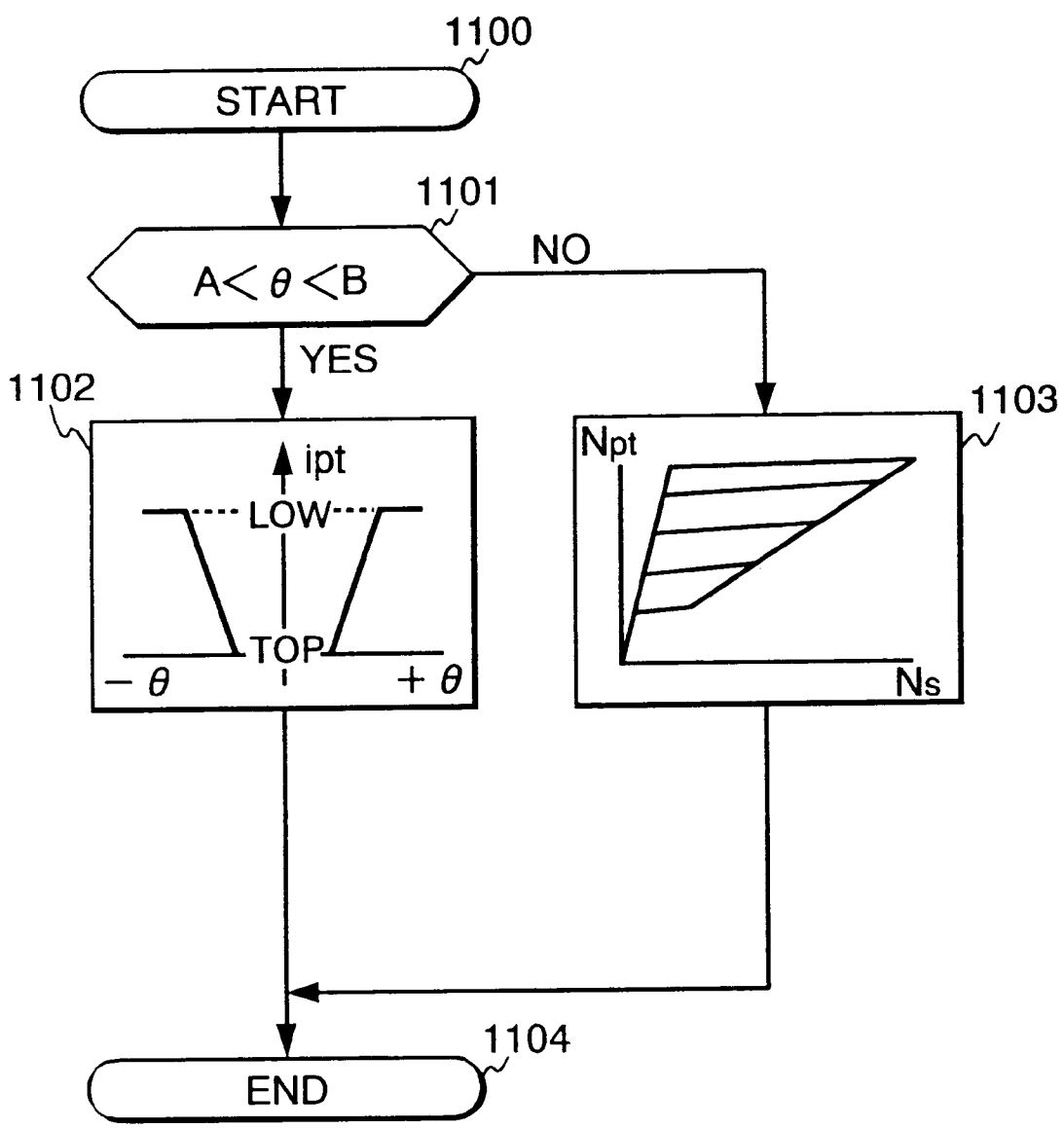
FIG. 16 is a flow chart illustrating the process of the ECU for the CVT of FIG. 10.

Finally, a flow of the processing of the ECU for the CVT performed repeatedly at a predetermined timing will be explained with reference to FIG. 16. In the following description, a flow of the processing after the calculation of the road gradient will be mainly explained.

Figure 18B:
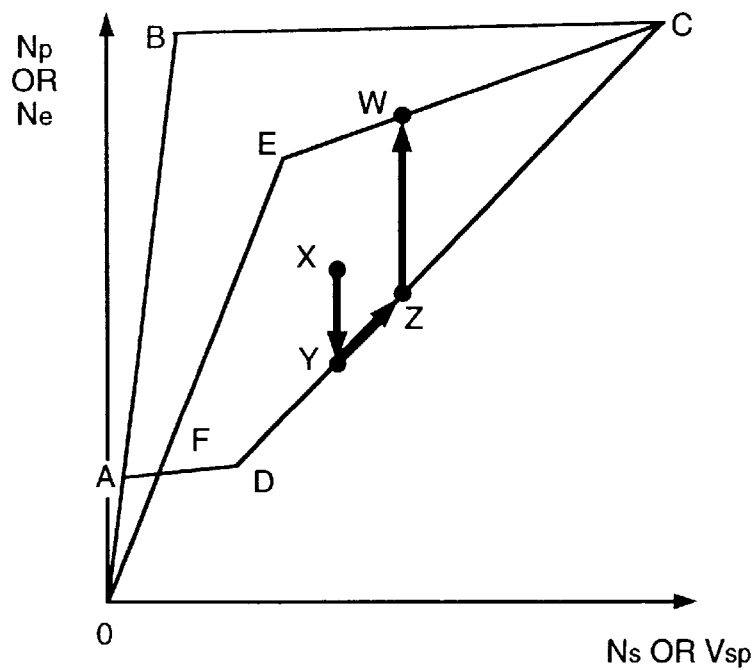
FIG. 18B is a diagram showing the gear schedule in a sport mode.

In step 1100, the road gradient calculating part 1047 calculates the gradient of the road on which the vehicle is running based on the above-mentioned processing. After then, the target gear ratio calculating part 1048 determines a state of the road on which the vehicle is running based on the road gradient θ calculated by the road gradient calculating part 1047. Namely, if the road gradient θ calculated by the road gradient calculating part 1047 is within the predetermined range (A<θ<B), then it is determined that the road on which the vehicle is running is flat, and the processing of step 1103 is performed. If the road gradient θ calculated by the running resistance detecting part 1043 is within the predetermined range (A≦θ or θ≦B), then it is determined that the road on which the vehicle is running is sloped, and the processing of step 1102 is performed. Where, in step 1103, the target gear ratio ipt of the CVT 1002 is calculated by using the target primary rpm Npt obtained from the gear schedule of FIG. 18B, and in step 1102, the target gear ratio ipt of the CVT 1002 obtained from the characteristic map (θ-ip characteristics) is corrected by using the correction value ipc for the target gear ratio obtained from the map representing the correction value for the target gear ratio. Further, in step 1104, the gear operation command output part 1049 drives the gear control valve 1018 by using the target gear ratio ipt of the CVT calculated by the target gear ratio calculating part 1048 on the basis of the above-mentioned processing. In the above processing of FIG. 16, when the vehicle enters into a slope (the road gradient θ satisfies A≦θ or θ≦B), the target gear ratio ipt of the CVT 1002 obtained from the characteristic map (θ-ip characteristics) is corrected by using the correction value ipc for the target gear ratio obtained from the map representing the correction value for the target gear ratio. However, it is not required to undertake such processing. Even if the vehicle enters into the slope, it is possible to calculate the target gear ratio ipt of the CVT 1002 by using the primary rpm Npt obtained from the gear schedule, and correct the target gear ratio by using the correction value ipc of the CVT 1002 and the road gradient θ. Here, the map of the correction value for the target gear ratio represents the corresponding information in which the road gradient θ is related to the correction value ipc of the target gear ratio ipt of the CVT 1002.

Figure 15A:
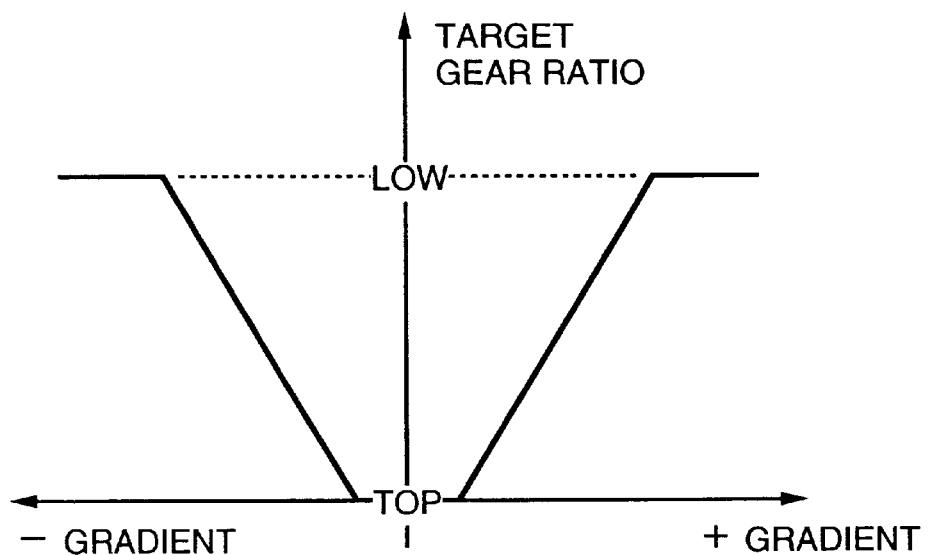
FIG. 15A is a characteristic map (θ-ipt characteristic view) from which a target gear ratio is obtained by a target gear ratio calculating part.
Figure 15B:
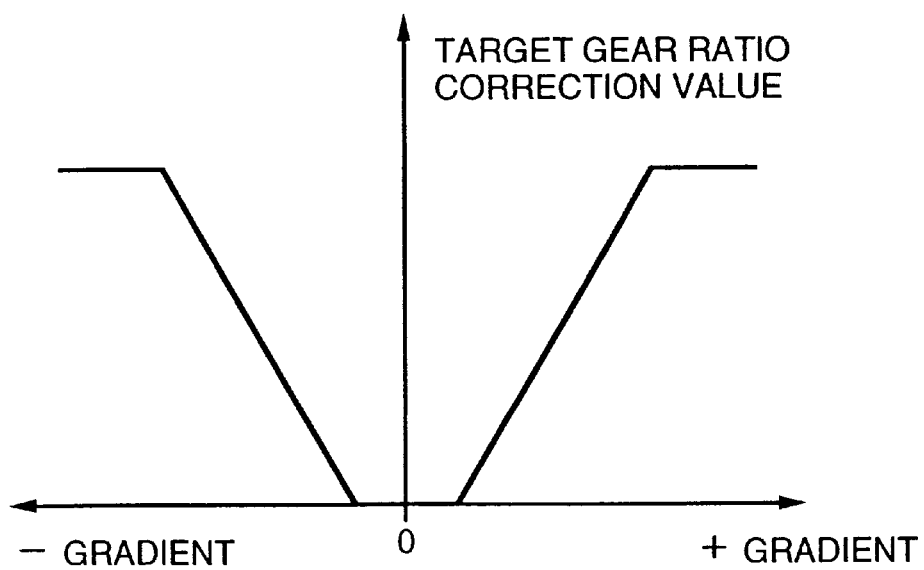
FIG. 15B is a map of correction values for the target gear ratio from which a correction value of the target gear ratio for the CVT is obtained by the target gear ratio calculating part.

In this case, after the road gradient calculating part 1047 calculates the road gradient θ in step 2200, the target gear ratio calculating part 1048 calculates the target gear ratio ipt of the CVT 1002 by using the target primary rpm Npt obtained from the gear schedule when the vehicle enters on a downhill. After then, in either one of steps 1204 and 1205, the correction value ipc used when the target gear ratio ipt of the CVT is corrected in step 1206 is set. Namely, in step 1203, if it is determined that the road on which the vehicle is running is flat, by using the determining standards similar to that in step 1101 of FIG. 16, then the correction value ipc is set to "0" in step 1205. Otherwise, the correction value ipc is set to a value obtained from the map of the correction values for the target gear ratio shown in FIG. 15B. The correction in this embodiment means that the correction value ipc of the target gear ratio ipt of the CVT 1002 obtained from the map of the correction values for the target gear ratio shown in FIG. 15B is added to the target gear ratio ipt of the CVT 1002. Because the target gear ratio of the CVT can be set with respect to the change in the road gradient, it is possible to maintain a comfortable driving even on a slope.

It should be appreciated that the present invention may be applied not only to a CVT system, but to a control system for a step type automatic transmission.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A control apparatus for an automatic transmission of a vehicle, in which a gear ratio of the automatic transmission is controlled by changing a speed ratio between an input-side rotating member to which the driving force from an engine is transmitted and an output-side rotating member through which the driving force is transmitted to driven wheels, comprising:

a vehicle speed detecting part for detecting the speed of the vehicle, road gradient estimating part for estimating a gradient of a road on which the vehicle is running, a road gradient determining part for determining if the road gradient estimated by a road gradient estimating part is beyond a predetermined threshold value, a vehicle speed determining part for determining a target vehicle speed based on vehicle speed detected by said vehicle speed detecting part, when it is determined by said gradient determining part that the road gradient is beyond the predetermined threshold value, and a control part for controlling the gear ratio so that the vehicle speed substantially matches the target vehicle speed determined by said vehicle speed determining part, when it is determined by said gradient determining part that the road gradient is beyond the predetermined threshold value, wherein said road gradient estimating part further comprises:

a vehicle driving-torque calculating part for calculating the vehicle driving-torque to drive the driven wheels, output from the output-side rotating member, a running resistance calculating part for obtaining a running resistance torque based on the vehicle speed detected by said vehicle speed detecting part, an acceleration torque calculating part for obtaining acceleration of the vehicle, and calculating acceleration torque based on the obtained acceleration, and a gradient calculating part for obtaining a gradient torque, and calculating the road gradient based on the gradient torque obtained by subtracting the running resistance torque calculated by said running resistance calculating part and the acceleration torque calculated by said acceleration torque calculating part from the vehicle driving torque calculated by said vehicle driving-torque calculating part.

2. A control apparatus for an automatic transmission of a vehicle according to claim 1, wherein said vehicle speed determining part determines, as a target speed, a value obtained by multiplying the vehicle speed detected by said vehicle speed detecting part when said gradient determining part determines that the road gradient is beyond the predetermined threshold value by a coefficient corresponding to the vehicle speed.

3. A control apparatus for an automatic transmission of a vehicle according to claim 1, wherein said vehicle speed determining part determines, as a target speed, a value obtained by multiplying the vehicle speed detected by said vehicle speed detecting part when said gradient determining part determines that the road gradient is beyond the predetermined threshold value by a coefficient corresponding to the road gradient estimated by said a road gradient estimating part.

4. A control apparatus for an automatic transmission of a vehicle according to claim 1, wherein said vehicle speed determining part determines, as a target speed. a value obtained by multiplying the vehicle speed detected by said vehicle speed detecting part when said gradient determining part determines that the road gradient is beyond the predetermined threshold value by a coefficient corresponding to the vehicle speed and a coefficient corresponding to the road gradient estimated by said road gradient estimating part.

5. A control apparatus for an automatic transmission of a vehicle according to claim 1, wherein said acceleration torque calculating part is configured and arranged to obtain the acceleration by time-differentiating the vehicle speed detected by said vehicle speed detecting part.

6. A control apparatus for an automatic transmission of a vehicle according to claim 1, wherein the driving force output from the engine is input to the input-side rotating member through a torque converter, wherein said vehicle driving torque calculating part comprises:

an engine speed detector for detecting engine revolutions per minute;

an input rpm detector for detecting rpm of the input-side rotating member;

an output rpm detector for detecting rpm of the output-side rotating member;

a gear ratio calculator for calculating the ratio of the rpm of input-side rotating member to the rpm of the output-side rotating member;

a slip ratio calculator for obtaining the slip ratio by calculating the ratio of the rpm of input-side rotating member to the engine speed;

a torque ratio calculator for obtaining the torque ratio corresponding to the calculated slip ratio by using a map which represents a relationship between a predetermined slip ratio of the torque converter and a torque ratio of a pump torque and a turbine torque;

a pump capacity coefficient calculator for obtaining a coefficient of pump capacity corresponding to the calculated slip ratio by using a map which represents a relationship between the predetermined slip ratio of the torque converter and the pump capacity coefficient, and wherein a driving force for vehicle wheels is calculated on the basis of the engine speed, the gear ratio, the torque ratio and the pump capacity coefficient.

7. A control method of an automatic transmission of a vehicle, in which a gear ratio of the automatic transmission is controlled by changing a speed ratio between an input-side rotating member to which the driving force from an engine is transmitted and an output-side rotating member through which the driving force is transmitted to driven wheels, comprising the steps of:

detecting speed of the vehicle, and a vehicle driving torque for driving driven wheels, output from the output-side rotating member;

obtaining a gradient torque by subtracting acceleration torque and running resistance torque obtained on the basis of the detected vehicle speed from the detected vehicle driving torque, and estimating a gradient of the road on which the vehicle is running on the basis of the gradient torque;

determining if the estimated road gradient is beyond a predetermined threshold value, determining a target vehicle speed on the basis of the vehicle speed when it is determined that the estimated road gradient is beyond the predetermined threshold value, and controlling the gear ratio so that the vehicle speed substantially matches the target vehicle speed determined when the estimated road gradient is beyond the predetermined threshold value.

8. A control apparatus for an automatic transmission of a vehicle, in which the gear ratio of a non-step transmission installed in the vehicle is controlled according to a running state of the vehicle, comprising:

a storing means for storing corresponding data in which a target gear ratio of the non-step transmission is uniquely identified by a road gradient;

a gradient estimating means for estimating the road gradient on which the vehicle is running by using the running state of the vehicle; and a determining means for determining that the vehicle is running on a slope when the estimated road gradient is within a predetermined range;

wherein a target gear ratio of the non-step transmission corresponding to the estimated road gradient due to the corresponding data stored in said storing means is used to control the gear ratio when said determining means determines that the vehicle is running on a slope.

9. A control apparatus for an automatic transmission of a vehicle according to claim 8, further comprising detecting means for calculating acceleration torque of the vehicle and running resistance torque thereof by vehicle weight and a vehicle speed detected during a run.

10. A control apparatus for an automatic transmission of a vehicle according to claim 8, further comprising detecting means for calculating a torque of an output shaft of the non-step transmission by using the gear ratio, the opening of the accelerator and the engine speed detected during a run.

11. A control method for an automatic transmission of a vehicle, in which the gear ratio of a non-step transmission installed in the vehicle is controlled according to a running state of the vehicle, comprising the steps of:

detecting acceleration torque, running resistance torque and an output shaft torque of the non-step transmission;

estimating a gradient of the road which the vehicle is running by using the running state of the vehicle detected at said detecting step;

determining that the vehicle is running on a slope when the estimated road gradient is within a predetermined range; and controlling the gear ratio of the non-step transmission so that the gear ratio of the non-step transmission substantially matches a target gear ratio corresponding to the estimated road gradient due to the corresponding data by which the target gear ratio is uniquely identified by the road gradient, when said determining step determines that the vehicle is running on a slope.

12. A control apparatus for an automatic transmission of a vehicle, in which the gear ratio of a non-step transmission installed in the vehicle is controlled according to a predetermined gear schedule using a running state of the vehicle, comprising:

apparatus for detecting acceleration torque, running resistance torque and a torque of an output shaft of the non-step transmission as the running state of the vehicle;

apparatus for storing corresponding data in which an amount of correction of a target gear ratio of the non-step transmission is uniquely identified by a road gradient;

apparatus for estimating the gradient of the road on which the vehicle is running by using the running state; and apparatus for correcting the gear ratio of the non-step transmission defined according to the predetermined gear schedule by using a correction value for the non-step transmission corresponding to the road gradient estimated due to the stored corresponding data, wherein the gear ratio of the non-step transmission is controlled so that the gear ratio substantially matches a corrected target gear ratio when the vehicle is determined to be running on a slope.

13. A control apparatus for an automatic transmission of a vehicle according to claim 12, wherein said detecting apparatus calculates the acceleration torque and the running resistance torque by using vehicle weight and vehicle speed detected during a run.

14. A control apparatus for an automatic transmission of a vehicle according to claim 12, wherein said detecting apparatus calculates a torque of an output shaft of the non-step transmission by using the gear ratio of the non-step transmission, an accelerator opening and engine speed, detected during a run.

15. A control method for an automatic transmission of a vehicle, in which the gear ratio of a non-step transmission installed in the vehicle is controlled according to a predetermined gear schedule using a running state of the vehicle, comprising the steps of:

detecting acceleration torque, running resistance torque and a torque of an output shaft of the non-step transmission as the running state;

estimating a gradient of the road on which the vehicle is running by using the running state;

correcting the gear ratio of the non-step transmission defined according to the predetermined gear schedule with a correction value for the non-step transmission corresponding to the road gradient estimated due to corresponding stored data, and controlling the gear ratio of the non-step transmission so that the gear ratio of the non-step transmission substantially matches the corrected target gear ratio when the vehicle is determined to be running on a slope.

* * * * *

UNITED STATES PATENT AND TRADEMARK OFFICE
CERTIFICATE OF CORRECTION

PATENT NO. : 6,029,107
DATED : February 22, 2000
INVENTOR(S) : Kazuhiko Sato

It is certified that error appears in the above-identified patent and that said Letters Patent is hereby corrected as shown below:

<u>Title page,</u>
Section [73], the following should be inserted after the assignee already listed:
-- Hitachi Car Engineering Co., Ltd., Japan --

Signed and Sealed this

Twenty-fifth Day of September, 2001

Attest:

*Nicholas P. Godici*

NICHOLAS P. GODICI
*Attesting Officer*     *Acting Director of the United States Patent and Trademark Office*